US011877120B2

(12) United States Patent
Voishvillo et al.

(10) Patent No.: US 11,877,120 B2
(45) Date of Patent: Jan. 16, 2024

(54) COMPRESSION DRIVER HAVING RECTANGULAR EXIT

(71) Applicant: Harman International Industries, Incorporated, Stamford, CT (US)

(72) Inventors: Alexander Voishvillo, Simi Valley, CA (US); Alex Pliner, Van Nuys, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 17/806,664

(22) Filed: Jun. 13, 2022

(65) Prior Publication Data

US 2023/0403500 A1 Dec. 14, 2023

(51) Int. Cl.
*H04R 1/30* (2006.01)
*H04R 1/34* (2006.01)

(52) U.S. Cl.
CPC ............... *H04R 1/30* (2013.01); *H04R 1/345* (2013.01); *H04R 2201/34* (2013.01); *H04R 2400/13* (2013.01)

(58) Field of Classification Search
None
See application file for complete search history.

(56) References Cited

U.S. PATENT DOCUMENTS

| | | | | |
|---|---|---|---|---|
| 4,718,517 | A | 1/1988 | Carlson | |
| 6,744,899 | B1 | 6/2004 | Grunberg | |
| 7,095,868 | B2 | 8/2006 | Geddes | |
| 2013/0243232 | A1* | 9/2013 | Dimitrov | H04R 1/323 381/340 |

OTHER PUBLICATIONS

Voishvillo, A. et al., "Compression Drivers' Phasing Plugs—Theory and Practice," Proceedings of the 141st Conference of the Audio Engineering Society, Convention Paper 9681, Sep. 20, 2016, Los Angeles, California, 16 pages.

Voishvillo, A. et al., "Evaluation of Efficiency and Voltage Sensitivity in Horn Drivers," Proceedings of the 145th Conference of the Audio Engineering Society, Convention Paper 10061, Oct. 7, 2018, New York, New York, 10 pages.

* cited by examiner

*Primary Examiner* — Walter F Briney, III
(74) *Attorney, Agent, or Firm* — McCoy Russell LLP

(57) ABSTRACT

A compression driver is provided. In one embodiment, the compression driver comprises an annular diaphragm, a phasing plug, and a housing, wherein the housing has a rectangular exit proximate to a blade of the phasing plug.

20 Claims, 16 Drawing Sheets

COMPRESSION DRIVER HAVING RECTANGULAR EXIT

FIELD

The disclosure relates to electro-acoustical drivers and loudspeakers employing electro-acoustical drivers. More particularly, the disclosure relates to configurations for compression drivers.

BACKGROUND

An electro-acoustical transducer or driver is utilized as a loudspeaker or as a component in a loudspeaker system to transform electrical signals into acoustical ones. A driver receives electrical signals and converts the electrical signals to acoustic signals. The driver typically includes mechanical, electromechanical, and magnetic elements to effect this conversion. Electro-acoustical transducers or drivers may be characterized into two broad categories: direct-radiating types and compression types. A compression driver first produces sound waves in a high-pressure enclosed volume, or compression chamber, before radiating the sound waves to the typically much lower pressure open-air environment. The compression chamber is open to a structure commonly referred as a phasing plug that works as a connector between the compression chamber and a horn. A compression driver utilizes a compression chamber on the output side of a diaphragm to generate relatively higher-pressure sound energy prior to radiating the sound waves from the loudspeaker. The area of the entrance to the phasing plug is smaller than an area of the diaphragm. This provides increased efficiency compared to a direct-radiating loudspeaker. Generally, compression drivers are primarily used for generating high sound-pressure levels.

Typically, a phasing plug is interposed between the diaphragm and the waveguide or horn portion of the loudspeaker, and is spaced from the diaphragm by a small distance (typically a fraction of a millimeter). Accordingly, the compression chamber is bounded on one side by the diaphragm and on the other side by the phasing plug. Reproduction and propagation of high frequency sounds may be controlled by configurations of the phasing plug, the wave guide, and an exit of the compression driver. A compression driver is thus desired which provides high frequency efficiency while reducing disadvantages such as detrimental acoustical non-linear effects, irregularity of frequency response, and limited frequency range.

SUMMARY

Embodiments are disclosed for a compression driver, comprising an annular diaphragm, a phasing plug, and a housing, wherein the housing has a rectangular exit proximate to a blade of the phasing plug. The phasing plug may include a hub having a blade-bullet shape, such that the hub has a base diameter and a blade length along a central axis, where the blade length is spaced apart from the base diameter by a height of the hub. The blade-bullet shape of the hub includes narrowing of a radius of the hub, perpendicular to the blade length, from the base diameter to the blade length along the central axis. The housing further comprises a waveguide channel with a circular inlet and the rectangular exit. An area of the waveguide channel may decrease from the circular inlet to the rectangular exit. The hub of the phasing plug is positioned in the waveguide channel to form a waveguide between the hub and the waveguide channel, through which sound waves may propagate. The blade-bullet shape of the hub and the decreasing area of the waveguide channel from the circular inlet to the rectangular exit may provide a waveguide wherein an area of the waveguide increases from the circular inlet to the rectangular outlet.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
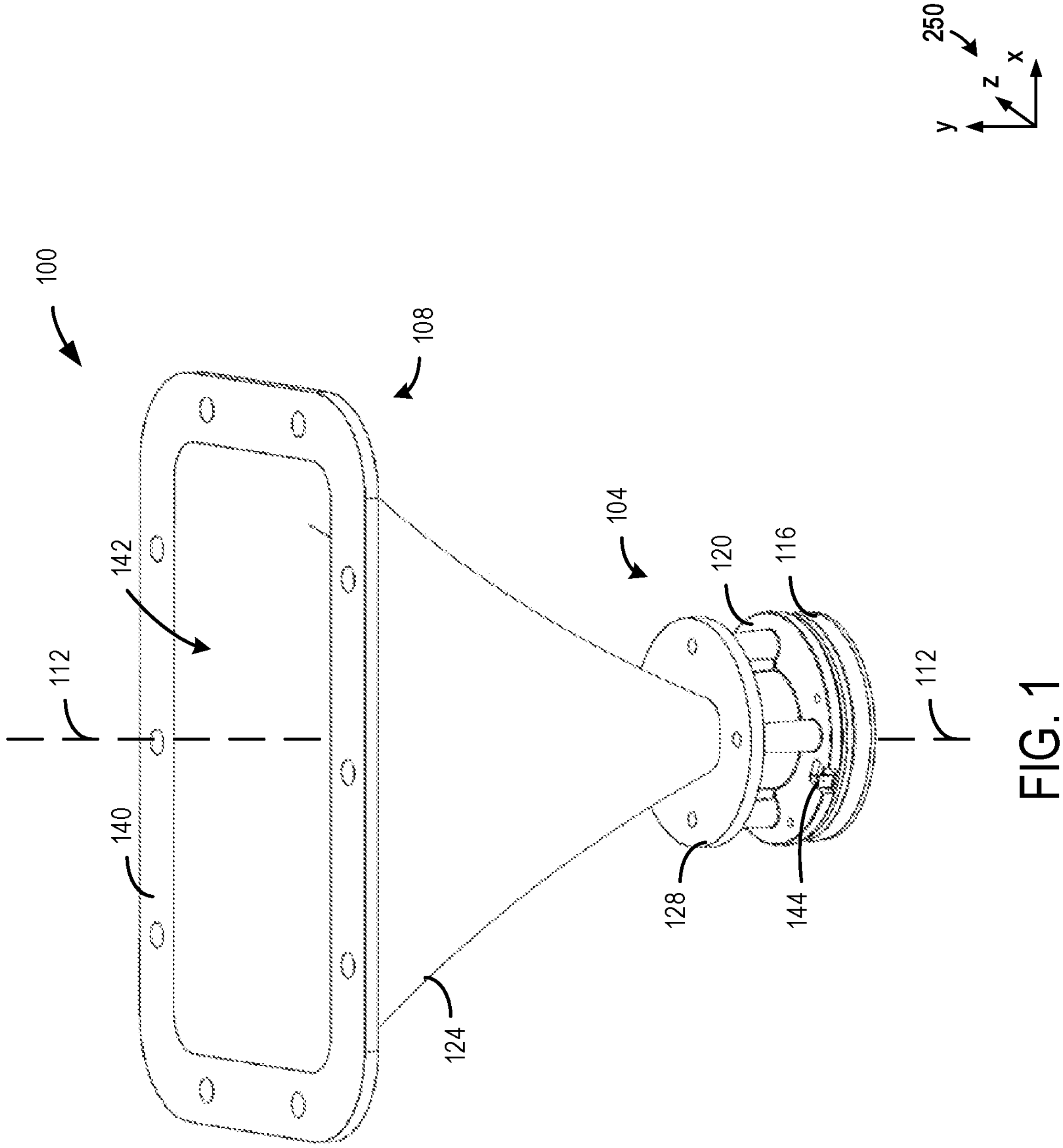
FIG. 1 shows a perspective view of an example of a loudspeaker in which a compression driver may be implemented, in accordance with one or more embodiments of the present disclosure.
Figure 2:
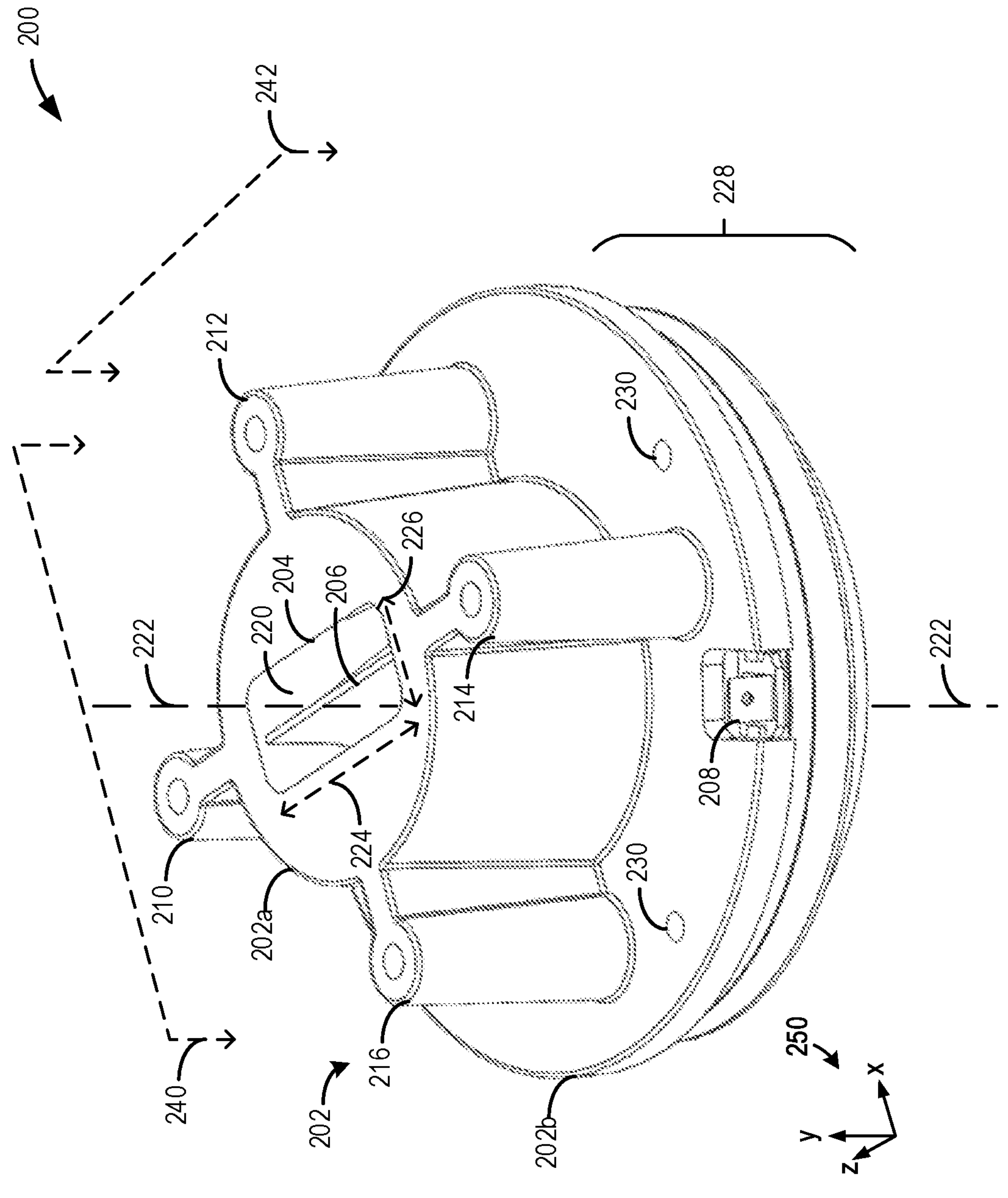
FIG. 2 shows a perspective view of a compression driver that may be provided with the loudspeaker of FIG. 1, in accordance with one or more embodiments of the present disclosure.
Figure 3:
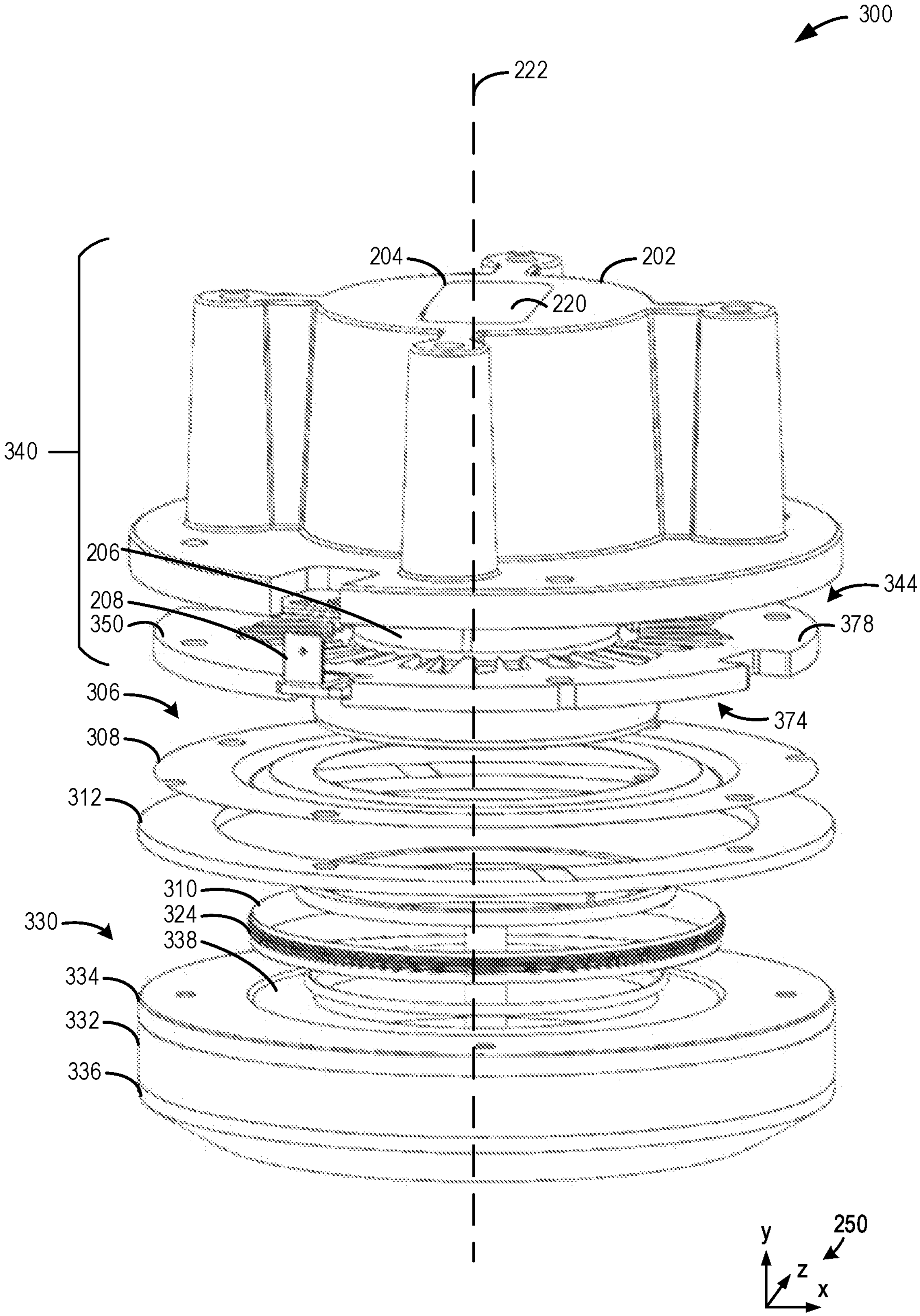
FIG. 3 shows an exploded perspective view of the compression driver of FIG. 2, in accordance with one or more embodiments of the present disclosure.
Figure 4:
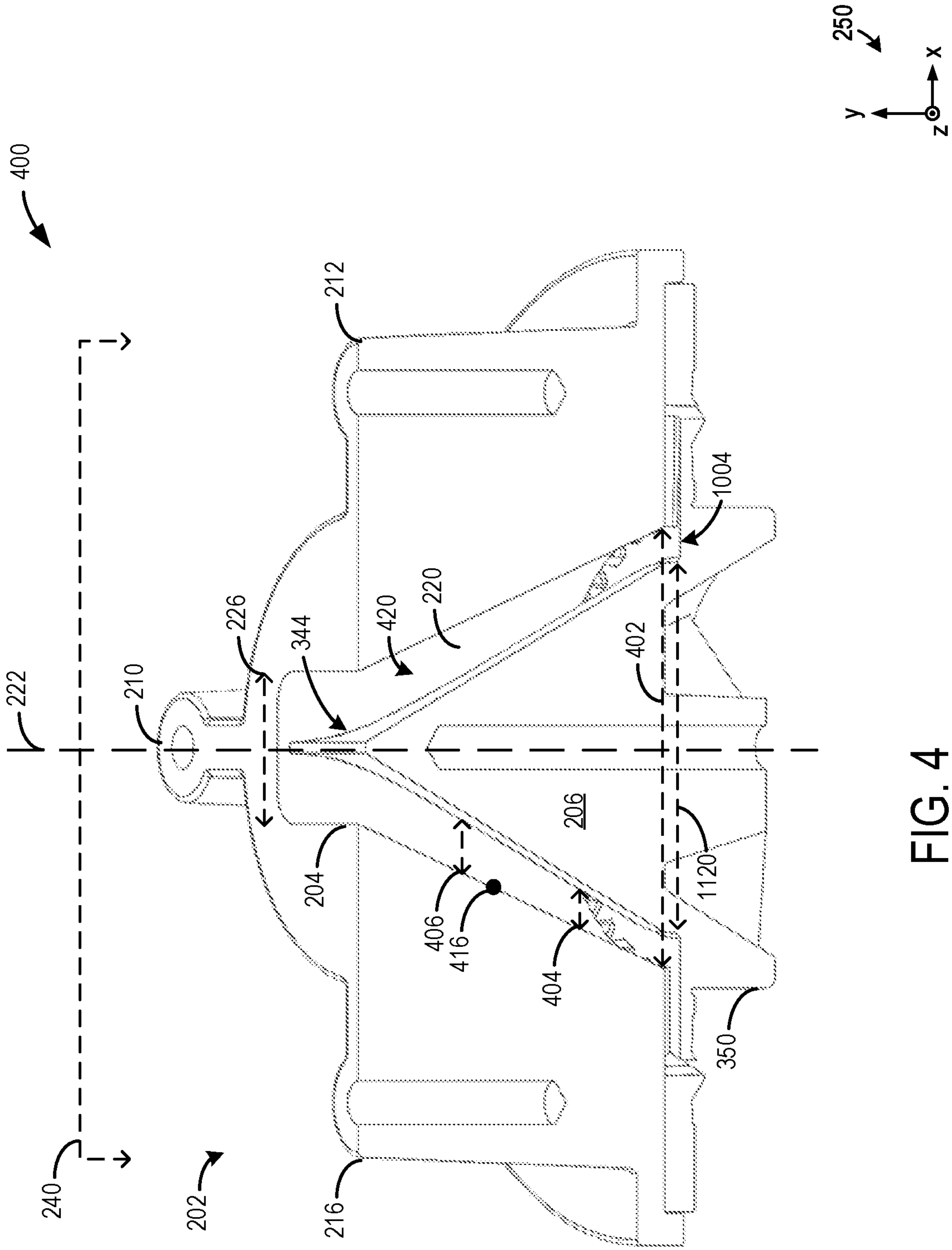
FIG. 4 shows a cross-sectional view along a first axis of the compression driver of FIG. 2, in accordance with one or more embodiments of the present disclosure.
Figure 5:
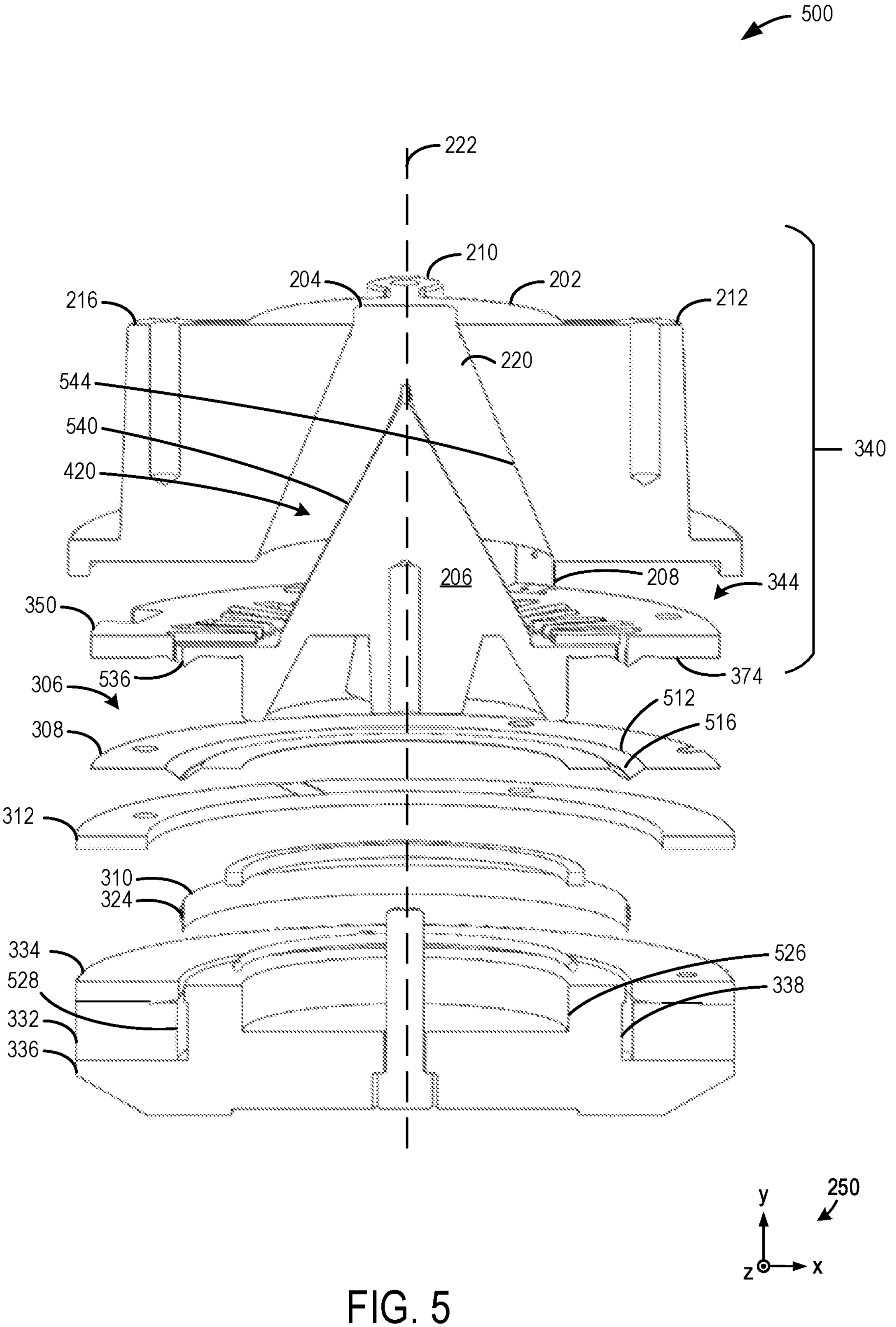
FIG. 5 shows an exploded view in cross-section along the first axis of the compression driver of FIG. 2, in accordance with one or more embodiments of the present disclosure.
Figure 6:
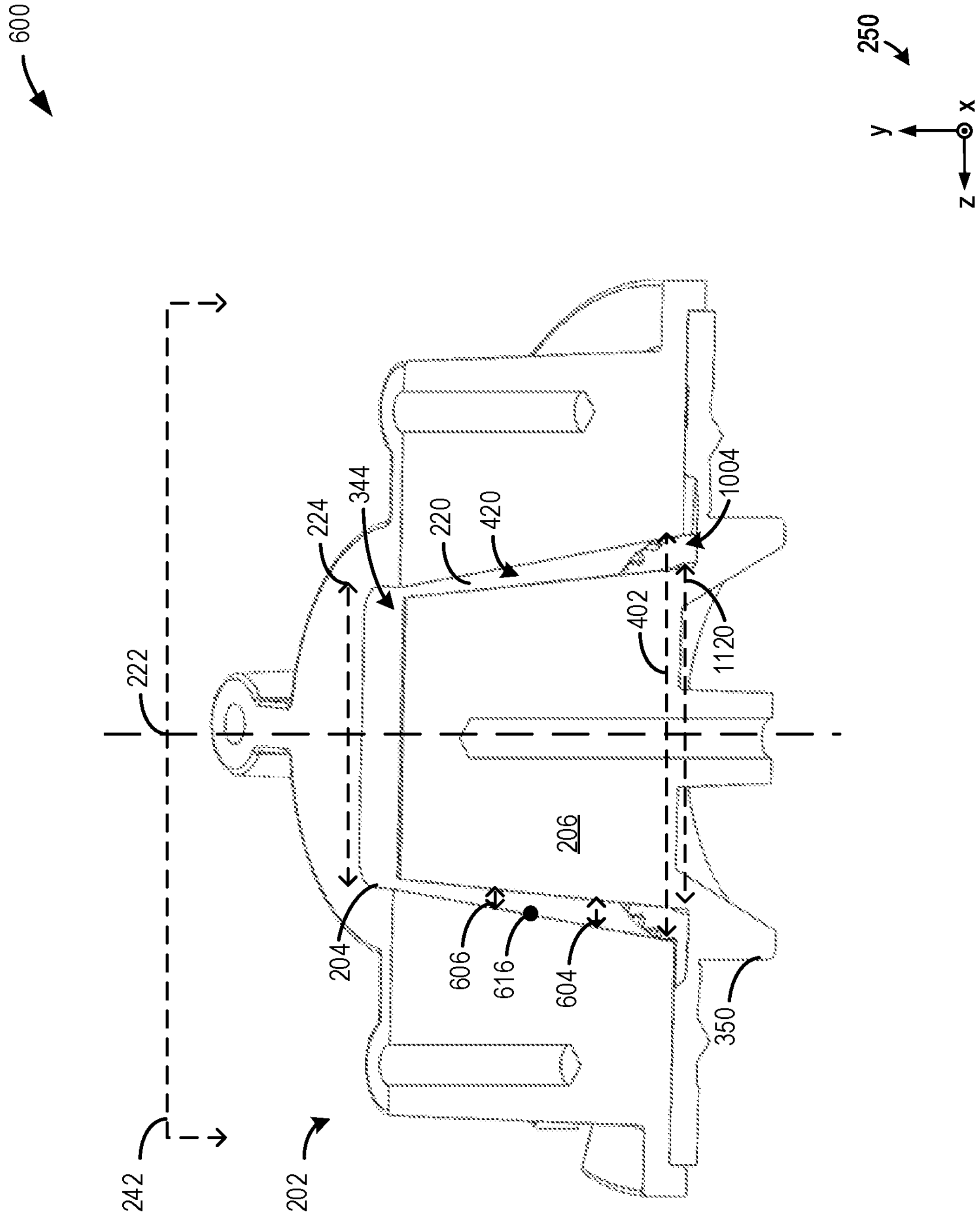
FIG. 6 shows a cross-sectional view along a second axis of the compression driver of FIG. 2, in accordance with one or more embodiments of the present disclosure.
Figure 7:
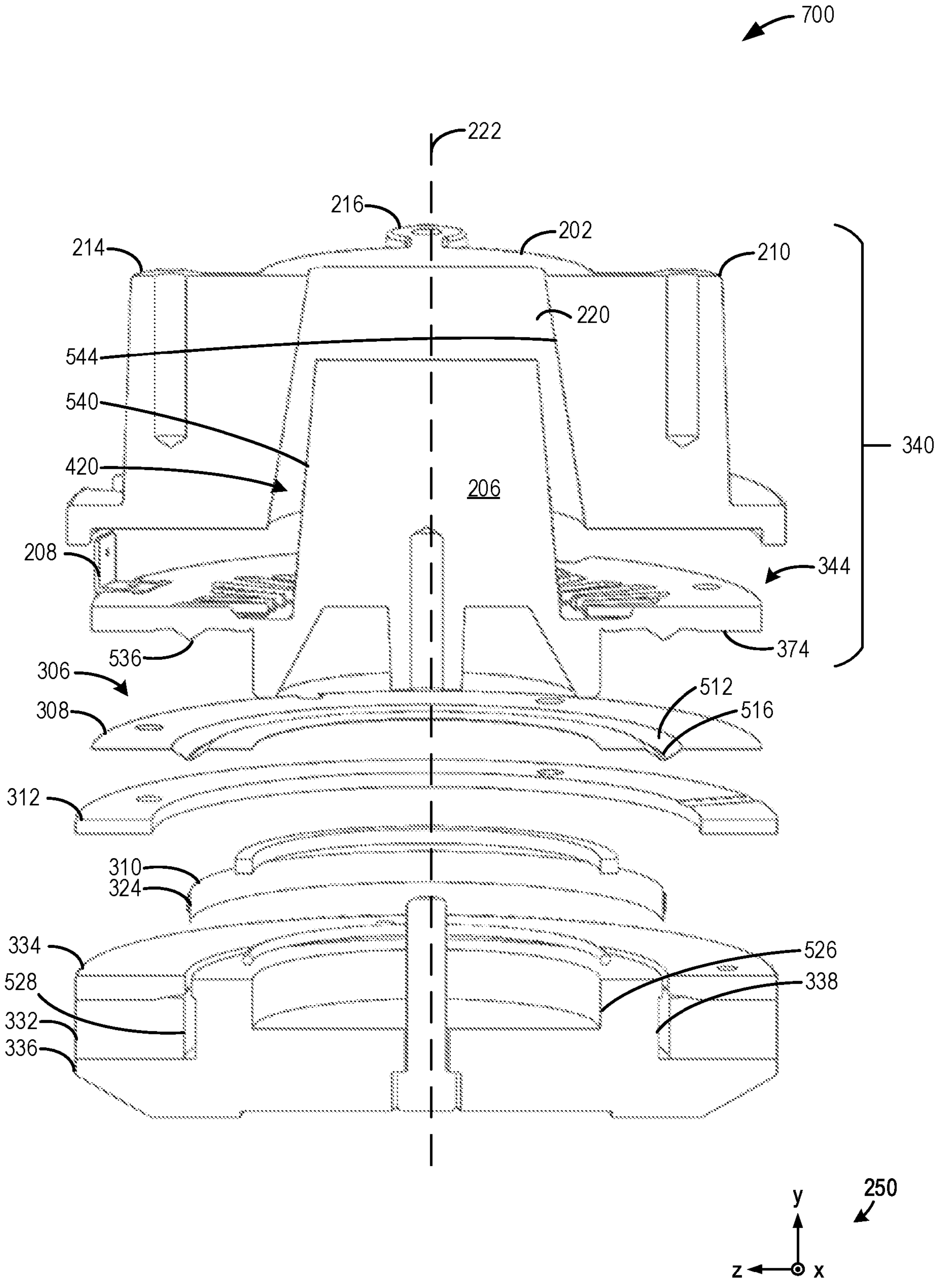
FIG. 7 shows an exploded view in cross-section along the second axis of the compression driver of FIG. 2, in accordance with one or more embodiments of the present disclosure.
Figure 8:
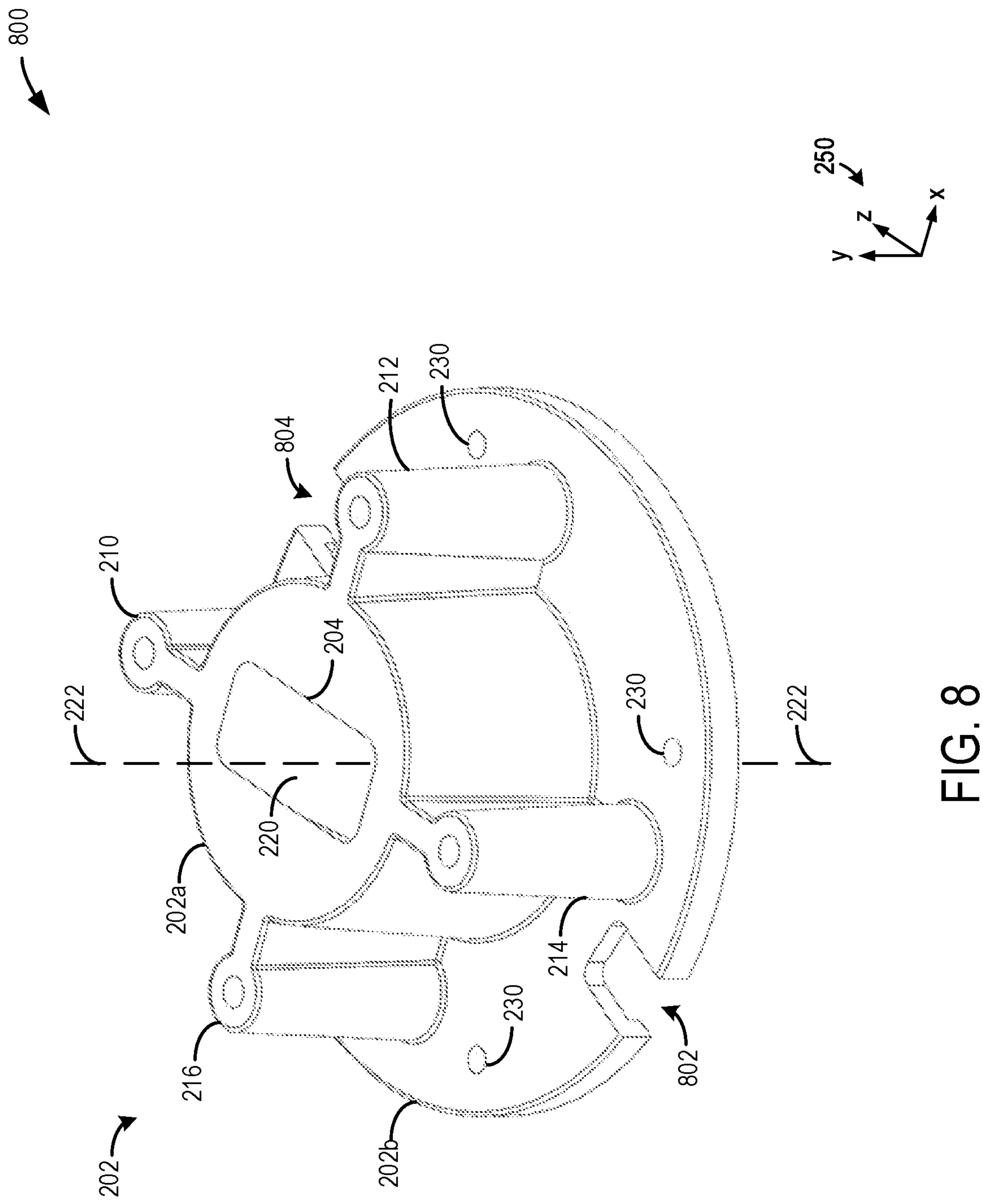
FIG. 8 shows a first perspective view of a housing of the compression driver of FIG. 2, in accordance with one or more embodiments of the present disclosure.
Figure 9:
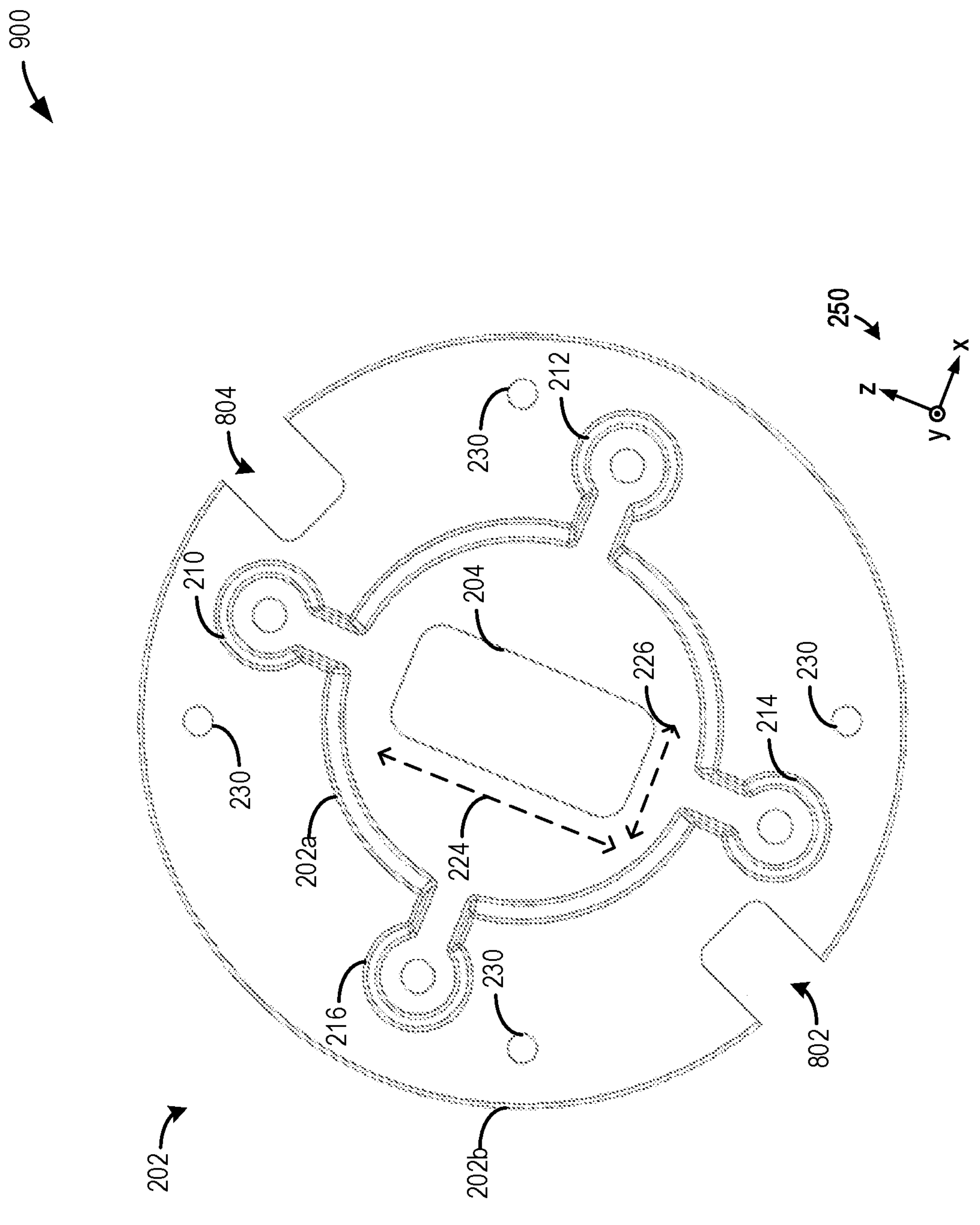
FIG. 9 shows a second perspective view of the housing of FIG. 8, in accordance with one or more embodiments of the present disclosure.
Figure 10:
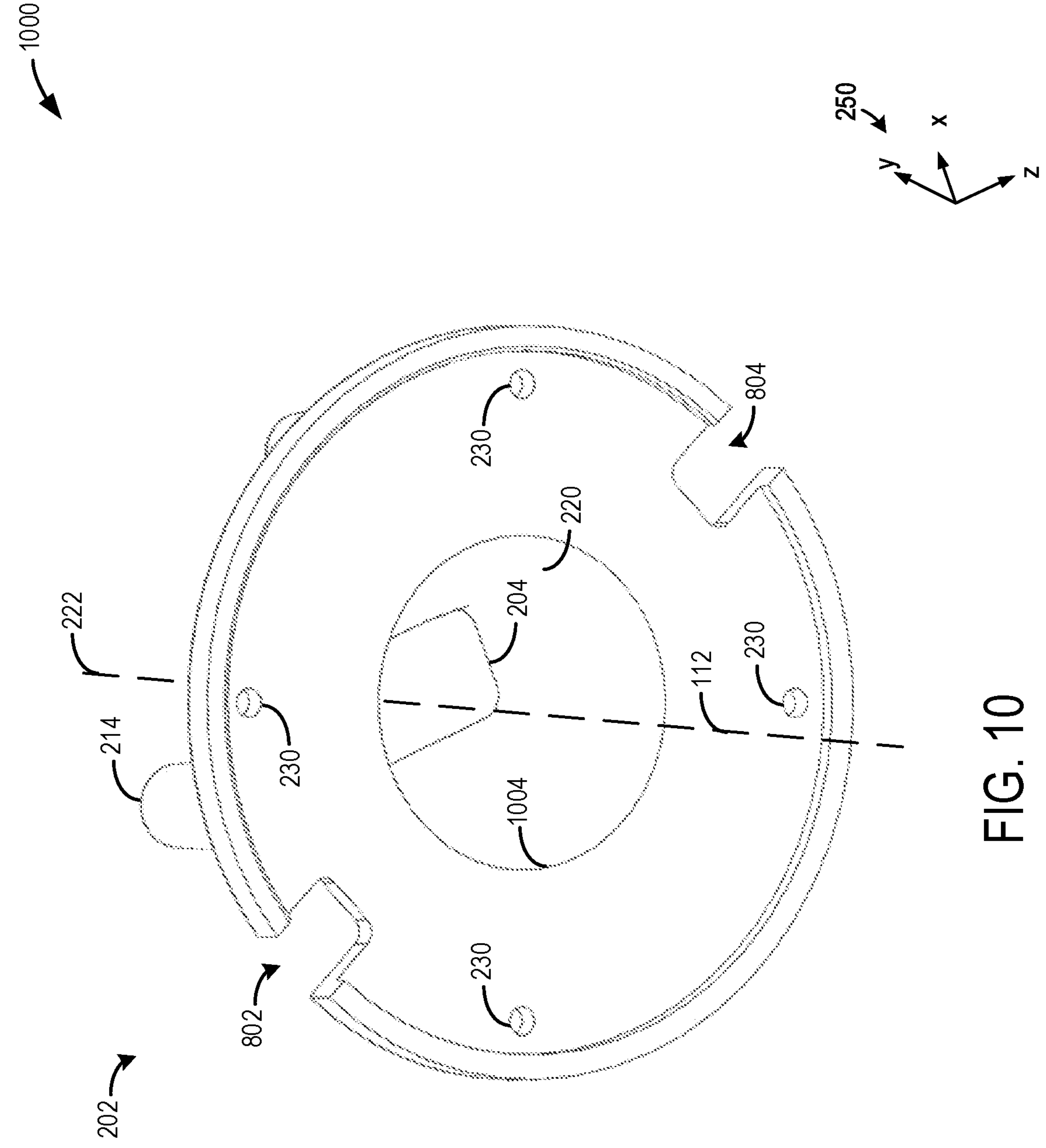
FIG. 10 shows a third perspective view of the housing of FIG. 8, in accordance with one or more embodiments of the present disclosure.
Figure 15:
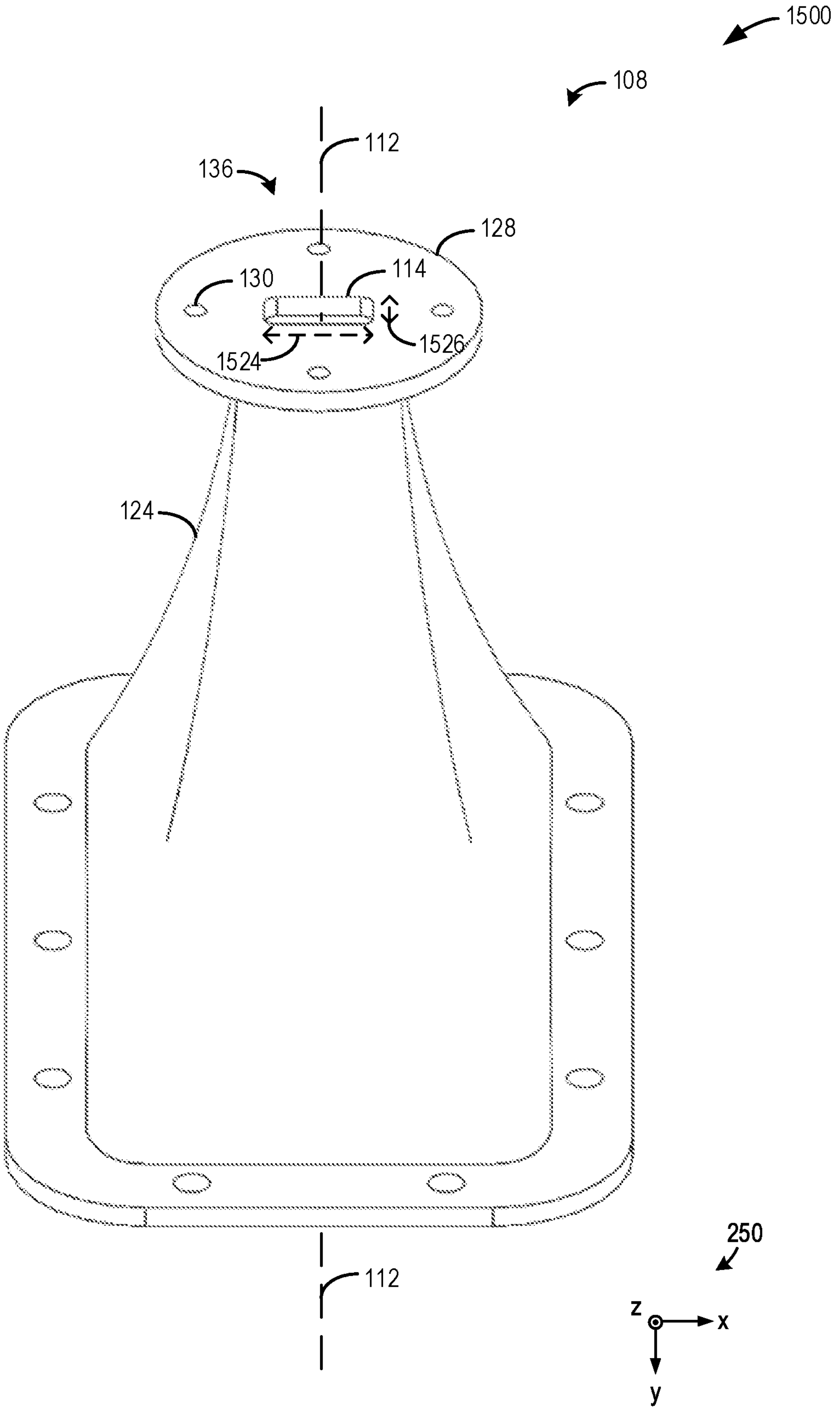
FIG. 15 shows a first perspective view of a horn of the loudspeaker of FIG. 1, in accordance with one or more embodiments of the present disclosure.
Figure 16:
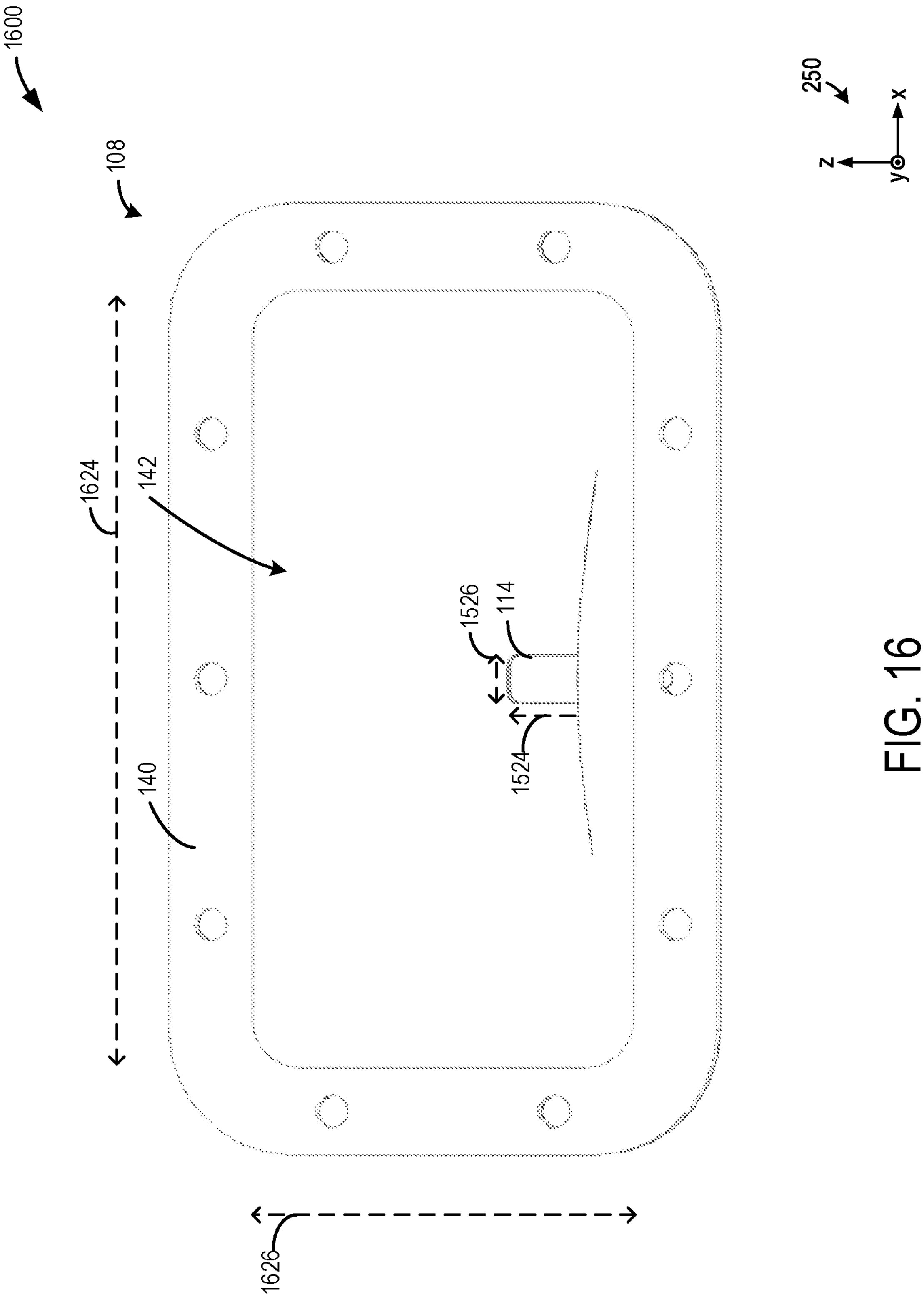
FIG. 16 shows a second perspective view of a horn of the loudspeaker of FIG. 1, in accordance with one or more embodiments of the present disclosure.

FIG. 1 illustrates a perspective view of an example of a loudspeaker 100 in which a compression driver as described herein may be implemented. FIG. 2 shows the compression driver, including a housing with a rectangular exit, and a phasing plug with a blade-bullet shape. An expanded view of the compression driver is shown in FIG. 3. FIGS. 4 and 6 show cross-sectional views of a phasing plug assembly of the compression driver, including the phasing plug and the housing, along a first axis and a second axis, respectively. FIGS. 5 and 7 show expanded cross-sectional views of the compression driver along the first and second axis, respectively. FIGS. 8-10 show additional views of the housing of the compression driver, including a waveguide channel extending therethrough and having the rectangular exit and a circular inlet. FIGS. 11-14 show additional views of the phasing plug, configured with the blade-bullet shape. FIGS. 15-16 show additional views of a horn of the loudspeaker of FIG. 1. FIGS. 1-16 are drawn approximately to scale however, other relative component dimensions may be used, in other embodiments. An axis system 250 is provided in FIGS. 1-16, for reference. The y-axis may be a vertical axis (e.g., parallel to a gravitational axis), the x-axis may be a lateral axis (e.g., horizontal axis), and the z-axis may be a longitudinal axis, in one example. However, the axes may have other orientations, in other examples.

FIG. 1 illustrates a perspective view of an example of a loudspeaker 100 in which a compression driver as described herein may be implemented. The loudspeaker 100 includes an electro-acoustical transducer section 104. In some implementations, the loudspeaker 100 may also include a horn 108. The transducer section 104 and horn 108 are generally disposed about a central axis 112. The transducer section 104 may include a rear section 116 and a housing 120. The rear section 116 may be coupled to the housing 120 by any suitable means. The rear section 116 and housing 120 may enclose components for realizing a driver of the compression type, an example of which is described below. The horn 108 may include a horn structure 124 such as one or more walls that enclose an interior 142 of the horn 108. As illustrated, the horn structure 124 may be flared outwardly from the central axis 112 to provide an expanding cross-sectional area through which sound waves propagate.

Turning briefly to FIGS. 15-16, additional views are shown of the horn 108 of the loudspeaker 100 of FIG. 1. FIG. 15 shows a first perspective view 1500 of the horn 108 and FIG. 16 shows a second perspective view 1600 of the horn 108. As shown in FIG. the horn 108 may have a circular plate 128 at an input end 136 for coupling the horn 108 to an output end of the housing 120. The input end 136 of the horn 108 may be coupled to the output end of the housing 120 by any suitable means. In the embodiment described herein, the circular plate 128 includes a plurality of through holes 130 which may be axially aligned with mounting points of the housing 120, as further described with respect to FIG. 2, to couple a compression driver 200 to the horn 108.

The circular plate 128 further includes a rectangular inlet 114. As further described herein with respect to FIGS. 2-10, the rectangular inlet 114 may be axially aligned, along the central axis 112, with a rectangular exit of the compression driver 200. Dimensions of the rectangular inlet 114 (e.g., a length 1524 along the x-axis and a width 1526 along the z-axis, with respect to the axis system 250) may at least partially determine control of sound wave directivity. For example, when the horn 108 is coupled to a compression driver, such as the compression driver 200 of FIG. 2, the rectangular inlet 114 may assist in providing directivity control for high frequency sound waves generated by the compression driver, as further described herein. Briefly, when a loudspeaker including the horn 108 coupled to the compression driver 200 is oriented such that the width 1526 of the rectangular inlet 114 (and respectively, a width of the rectangular exit of the compression driver 200) is positioned in a horizontal dimension (e.g., perpendicular to an amplitude of sound waves), the width 1526 may be as small as is desired to provide high frequency directivity control while the length 1524 may be as large as is desirable for an area of the rectangular inlet 114 to approximately equal an area of the rectangular exit of the compression driver 200.

The horn structure 124 extends from the circular plate 128 along the central axis 112, as described with respect to FIG. 1. As described with respect to FIG. 16, the horn 108 may have a rectangular throat formed by the horn structure 124 flaring outwardly along the central axis 112 from the rectangular inlet 114 to the mouth 140. The mouth 140 may have a rectangular shape, where a mouth length 1624 is parallel to the width 1526 of the rectangular inlet 114 and a mouth width 1626 is parallel to the length 1524 of the rectangular inlet 114.

Generally, the loudspeaker 100 receives an input of electrical signals at an appropriate connection, such as contacts 144 provided by the transducer section 104 (such as may be located at the rear section 116) and converts the electrical signals into acoustic signals according to mechanisms briefly summarized above and further described herein. The acoustic signals propagate through the interior of the housing 120 and horn 108 and exit the loudspeaker 100 at the mouth 140 of the horn 108.

As a general matter, the loudspeaker 100 may be operated in any suitable listening environment such as, for example, the room of a home, a theater, or a large indoor or outdoor arena. Moreover, the loudspeaker 100 may be sized to process any desired range of the audio frequency band, such as the high-frequency range (generally 2 kHZ-20 kHz) typically produced by tweeters, the midrange (generally 200 HZ-5 kHz) typically produced by midrange drivers, and the low frequency range (generally 20 HZ-200 Hz) typically produced by woofers. Loudspeakers of the horn driver-type, (e.g., loudspeaker 100) may be particularly advantageous when utilized to process relatively high frequencies (e.g., midrange to high range), and compression drivers may be more efficient at higher frequencies than non-compression driver configurations such as the direct radiating type.

As described with respect to FIG. 2, a compression driver may be further configured with a phasing plug enclosed in a housing and a diaphragm as an element of a rear section. When the compression driver receives an input of electrical signals at a connection coupled to a voice coil, the voice coil may oscillate along a central axis, such as the central axis 112, and oscillate the diaphragm in turn, which converts the electrical signals into acoustic signals. For example, the electrical signals may be directed through a circular voice coil that is attached to the diaphragm. The voice coil may be positioned in an air gap with a radially oriented permanent magnetic field provided by a permanent magnet and steel elements of a magnet assembly. Due to the Lorenz force affecting the conductor of current positioned in the permanent magnetic field, the alternating current corresponding to electrical signals conveying audio signals actuates the voice coil to reciprocate back and forth in the air space and, correspondingly, move the diaphragm to which the voice coil is attached. The diaphragm may be suspended by one or more supporting elements (e.g., a surround, spider, or the like) such that at least a portion of the diaphragm is permitted to move. Accordingly, the reciprocating voice coil actuates the diaphragm to likewise reciprocate and, consequently, produce acoustic signals that propagate as sound waves through a suitable fluid medium such as air. A thin layer of air may be trapped between the diaphragm and the phasing plug, herein referred to as a compression chamber, and sound waves from the oscillating diaphragm may propagate through air of the compression chamber and into the phasing plug. Sound waves may be guided out of the compression driver by a configuration of the housing as well as the phasing plug positioned therein. The phasing plug may thus act as a short horn to acoustically connect the compression chamber an outlet (e.g., exit) of the compression driver. Pressure differences in the fluid medium associated with these waves may be interpreted by a listener as sound. The sound waves may be characterized by their instantaneous spectrum and level.

The compression driver at its output side may be coupled to an acoustic waveguide (e.g., the horn 108), which is a structure that encloses the volume of medium into which sound waves are first received from the driver. The acoustic waveguide may be designed to increase the efficiency of the compression driver and control the directivity of the propagating sound waves. The acoustic waveguide typically includes one open end coupled to the driver, and another open end or mouth downstream from the driver-side end. Sound waves produced by the compression driver propagate through the acoustic waveguide and are dispersed from the mouth to a listening area. The acoustic waveguide is often structured as a horn or other flared structure such that the interior defined by the acoustic waveguide expands or increases from the driver-side end to the mouth.

An area of a phasing plug entrance (e.g., proximate to the compression chamber) may be significantly smaller than an area of the diaphragm to increase loading impedance for the oscillating diaphragm and therefore increase an efficiency of the compression driver. For example, the area of the phasing plug entrance may be six to ten times smaller than the area of the diaphragm. When a cross-sectional area of the compression driver is considered, a phasing plug assembly, including a channel formed through a center of the housing and the phasing plug positioned therein, may be a short horn connecting the compression chamber and an exit of the compression driver. As with a conventional horn, a cross-sectional area of the phasing plug assembly may increase from an input (e.g., an inlet to the channel formed through the center of the housing) to an output (e.g., the exit of the compression driver). In configurations where the cross-sectional area of the phasing plug assembly decreases from the input to the output, reflections and irregularities in sound pressure frequency response may occur. Therefore, to reduce reflections and undesirable inconsistencies in sound pressure frequency responses, it is desirable for the cross-sectional area of the phasing plug assembly to increase from the input to the output, which may include the area of the phasing plug entrance being less than the area of the diaphragm and less than the area of the exit of the compression driver.

A diameter of the exit of the compression driver, and correspondingly, a diameter of an inlet of the horn, may determine control of sound wave directivity at high frequencies. Conventional compression drivers may be configured with a circular exit at the output end of the housing, which may match dimensions of a circular inlet at the input end of the horn. At high frequencies, the diameter of the inlet of the horn controls directivity. A beam width of a sound wave narrows as a frequency of the sound wave increases. Therefore, to provide directivity control for higher frequency sound waves and provide a reproducible directivity response, it is desirable to have the diameter of the inlet of the horn be as small as possible. However, as described above, it is desirable for the cross-sectional area of the phasing plug assembly to increase from the input to the output.

Herein described is a compression driver configured with a rectangular exit and a phasing plug having a blade-bullet shape. The phasing plug with the blade-bullet shape may be positioned between an annular diaphragm and the housing of the compression driver, where the housing is configured with a waveguide channel in which the phasing plug fits. The waveguide channel may have a circular inlet which gradually narrows to the rectangular exit. Additionally, the blade-bullet shape transforms from a circular base (e.g., a phasing plug entrance) to a linear blade (e.g., the blade of the blade-bullet shape). Together, the blade-bullet shape of the phasing plug and the housing with the waveguide channel may form a waveguide, through which sound waves generated by oscillation of the annular diaphragm may propagate. A cross-sectional area of the waveguide may increase from the circular inlet to the rectangular exit even though an area of the circular inlet may be greater than an area of the rectangular exit. In this way, reflections and undesirable inconsistencies in sound pressure frequency responses may be reduced.

Additionally, dimensions of the rectangular exit may be adjusted such that the rectangular exit of the compression driver may be sufficiently small to provide directivity control for higher frequency sound waves and provide a reproducible directivity response. As the exit of the compression driver is not circular, a length and a width of the exit may be independently adjusted, and therefore may not be equal (e.g., forming the rectangular exit). A width of directivity in a horizontal plane (e.g., with respect to a direction of gravity) may be larger than a width of directivity in a vertical plane (e.g., parallel to the direction of gravity). Therefore, the rectangular exit may have a vertical dimension (e.g., length) which is greater than a horizontal dimension (e.g., width).

Sound waves generated by oscillation of the annular diaphragm may enter the phasing plug and propagate along the waveguide formed by the phasing plug and the waveguide channel of the housing. Sound waves may exit the compression driver through the rectangular exit and may enter a similarly shaped rectangular inlet of a horn. In this way, directivity control for a higher frequency range may be achieved by adjusting the horizontal dimension (e.g., the width) of the compression driver exit to be as small as is desirable for directivity control at high frequencies, and a cross-sectional area of the waveguide may increase from the inlet to the exit, to reduce reflections and undesirable inconsistencies in sound pressure frequency responses.

Turning now to FIG. 2, a perspective view of an embodiment of a compression driver 200 is shown. The compression driver 200 may be provided as part of the transducer section 104 of the loudspeaker 100 of FIG. 1. As shown in FIG. 2, the compression driver 200 may include a housing with a rectangular exit, and a phasing plug with a blade-bullet shape, which may be positioned in a waveguide channel of the housing. A length and a width of the rectangular exit may be sized such that high frequency sound waves may be provided with directivity control from the width, which may be smaller than the length. Further, the waveguide channel and the phasing plug may be sized such that an area of a waveguide formed by the waveguide channel and the phasing plug may increase from an inlet of the waveguide channel to the rectangular exit, which may reduce reflections and undesirable inconsistencies in sound pressure frequency responses.

The compression driver 200 is configured with a housing 202, which may be the housing 120 of FIG. 1. The housing 202 may include a base portion 202*b* and a hub portion 202*a*, both of which are coupled and coaxially disposed about a central axis 222 (e.g., equivalent to the central axis 112 of FIGS. 1, 15-16). As described with respect to FIGS. 1-3, the housing 202 includes elements for coupling the housing 202 to a horn, such as the horn 108 of FIG. 1, and to other elements of the compression driver 200. In the embodiment described herein, the housing 202 may include a plurality of through holes 230, which may extend through a thickness of the base portion 202*b* and be used to couple the housing 202 to other elements of the compression driver 200, as described with respect to FIGS. 4-7. The hub portion 202*a* of the housing 202 further includes a plurality of mounting points, including a first mount 210, a second mount 212, a third mount 214, and a fourth mount 216. Each of the plurality of mounting points may be used to couple the housing 202 to the horn. For example, a bolt (not shown) may extend from a center of each of the plurality of mounting points and be received by a coupling element of the horn. Other elements and/or methods may be used to couple the horn to the compression driver 200 via the plurality of mounting points. In other embodiments, the housing 202 may be configured with greater than or less than four coupling elements, which may be configured as described herein or may have any other geometry sufficient to couple a horn to the housing 202.

The housing 202 further includes a rectangular exit 204 through which sound waves may propagate from the compression driver 200 to the horn. The rectangular exit 204 may have a length 224 and a width 226. For example, the rectangular exit 204 may be defined by four inner walls of the housing 202 where a first set of two parallel walls are longer (e.g., the length 224) than a second set of two parallel walls (e.g., the width 226), which are perpendicular to the first set of two parallel walls. In some orientations, the length 224 is parallel to a vertical dimension and the width 226 is parallel to a horizontal dimension when the compression driver 200 is arranged with a central axis 222 perpendicular to a direction of gravity (e.g., the y-axis of the axis system 250). A width of directivity in a horizontal plane (e.g., with respect to a direction of gravity) may be larger than a width of directivity in a vertical plane (e.g., parallel to the direction of gravity) for sound waves. Therefore, the rectangular exit 204 may have a vertical dimension (e.g., the length 224) which is greater than a horizontal dimension (e.g., the width 226).

Values of the length 224 and the width 226 may be independent of each other, such that the width 226 may be sized to provide directivity control to sound waves of high frequencies and the length 224 may be sized such that an area of a waveguide increases from an inlet to the rectangular exit 204, as further described herein.

A waveguide channel 220 may extend through a height of the housing 202 (e.g., through the hub portion 202*a* and the base portion 202*b* along the central axis 222). The waveguide channel 220 may have an inlet proximate to a rear section 228 of the compression driver 200, which may be equivalent to the rear section 116 of FIG. 1. The rear section 228 includes a base of a phasing plug, a diaphragm, and other elements of the compression driver 200, which are described with respect to FIGS. 3, 5, and 7. As described herein, positioning the inlet proximate to the rear section 228 indicates the inlet is closer to the rear section 228 than the rectangular exit 204 is to the rear section 228. The hub 206 of the phasing plug may be positioned in the waveguide channel 220 of the housing 202 to form a waveguide. As further described with respect to FIGS. 4 and 6, the waveguide may be sized such that an area of the waveguide increases from the inlet to the rectangular exit 204. The rear section 228 may further include at least one connector 208 (e.g., contacts 144 shown in FIG. 1) coupled to the base of the phasing plug and extending through a cutout in the housing 202, as described with respect to FIGS. 3, 5, 7, and 11-14.

During operation of the compression driver 200 (e.g., as part of a loudspeaker, such as the loudspeaker 100 of FIG. 1), an electrical signal may be provided to the at least one connector 208, which may energize and therefore create a magnetic field at a voice coil (not shown). The magnetic field of the voice coil may oppose a magnetic field of a magnet (not shown) of the compression driver 200, and the voice coil may move along the central axis 222 of the compression driver 200. The voice coil may be coupled to the annular diaphragm and the annular diaphragm may consequentially oscillate. Oscillation of the annular diaphragm may reproduce sound waves, such sound waves in a high frequency range. Sound waves may be directed out of the rectangular exit 204 of the compression driver 200 by the waveguide (e.g., formed by the phasing plug and the waveguide channel 220 of the housing 202). In this way, directivity of high frequency sound waves may be controlled by the rectangular exit 204 and reflections and undesirable inconsistencies in sound pressure frequency responses may be reduced by the waveguide. Further details of the compression driver 200 are described with respect to FIGS. 3-14.

FIG. 3 shows an exploded perspective view 300 of the compression driver 200 of FIG. 2 and associated components and features that may be provided as parts of the transducer section 104 of the loudspeaker 100 of FIG. 1. As briefly described with respect to FIG. 2, the compression driver 200 may further include a magnet and a voice coil coupled to a diaphragm such that, when an electrical signal is applied to a connector, such as the at least one connector 208 of FIG. 2, a magnetic field generated at the voice coil may work in opposition to a magnetic field of the magnet, and the voice coil may oscillate axially along the central axis 222 to oscillate the diaphragm, which may reproduce sound waves. The sound waves may propagate through a base of the phasing plug, along the waveguide formed by the phasing plug and the waveguide channel of the housing 202, and out of the compression driver 200 via the rectangular exit 204.

The compression driver 200 may include a diaphragm 308, one or more suspension members 312 for supporting the diaphragm 308 while enabling the diaphragm 308 to oscillate, and a magnet assembly 330. In the herein disclosed embodiment, the diaphragm 308 is configured as an annular ring that is disposed coaxially with the central axis 222. The magnet assembly 330 may comprise an annular permanent magnet 332, an annular top plate 334, and a back plate 336 that includes a centrally disposed annular pole piece 338. The magnet assembly 330 may provide a permanent magnetic field in a gap (see FIGS. 5 and 7 and related description below) between the pole piece 338 and an inside surface of the annular top plate 334 for electrodynamic coupling with a voice coil 324. The voice coil 324 may be used for producing the movement of a flexible portion of the diaphragm 308 and a structural member such as a coil former 310 for supporting the voice coil 324.

The compression driver 200 may also include a phasing plug assembly 340 that comprises the housing 202 and a phasing plug 344 generally disposed within the housing 202. The phasing plug 344 may include a base 350 and the hub 206, both of which are coaxially disposed about the central axis 222. The hub 206 may also be referred to as a blade-bullet. The base 350 generally includes an input side 374 generally facing the diaphragm 308, and an opposing output side 378 generally facing the interior of the housing 202 (e.g., the waveguide channel 220). The base 350 may further include one or more apertures (described below and illustrated in FIGS. 11-14) that extend as channels through the thickness of the base 350 from the input side 374 to the output side 378.

When the compression driver 200 is assembled, the phasing plug 344 may be positioned in the waveguide channel 220 of the housing 202, as described with respect to FIGS. 4-7. This may form the waveguide through which sound waves may propagate. Prior to description of the waveguide and corresponding generation and propagation of sound waves, the housing 202 and the phasing plug 344 will be described in further detail, with respect to FIGS. 8-10 and FIGS. 11-14, respectively.

FIGS. 8-10 show additional views of the housing 202 of the compression driver 200. As described above, the housing 202 includes the rectangular exit 204, an inlet, and a waveguide channel therebetween. FIG. 8 shows a first perspective view 800 of the housing 202, FIG. 9 shows a second perspective view 900 of the housing 202, and FIG. 10 shows a third perspective view 1000 of the housing 202. Elements of the housing 202 which are introduced in FIGS. 1-3 may be shown in FIGS. 8-10 and may not be reintroduced for brevity.

The housing 202 includes the base portion **202*b* and the hub portion 202*a*, both of which are coupled and coaxially disposed about the central axis 222. The base portion 202*b* of the housing 202 is configured with cutouts for positioning connectors therein which, when provided with electrical signals, energize a voice coil of the compression driver. In the embodiment shown herein, the housing 202 includes a first cutout 802 and a second cutout 804, however other embodiments of housings for a compression driver having a rectangular exit may include more than or less than two cutouts. A connector may be coupled to the phasing plug 344, as further described with respect to FIGS. 11-14, and may extend axially through each of the cutouts, with respect to the central axis 222**.

Further, the housing 202 is configured with the waveguide channel 220, having a circular inlet 1004, shown in FIG. 10, and the rectangular exit 204, shown at least in part in FIGS. 8-10. The waveguide channel 220 may extend through the hub portion **202*a* and the base portion 202*b* of the housing 202, along the central axis 222. Further detail regarding the waveguide channel 220 is described with respect to FIGS. 4-7**.

The hub portion **202*a* as well as each of the coupling elements may gradually decrease in diameter along the central axis 222 from the circular inlet 1004 to the rectangular exit 204, such that a diameter of each of the hub portion 202*a* and the coupling elements proximate to the circular inlet 1004 (e.g., in radial alignment with the circular inlet 1004, with respect to the central axis 222) is greater than a diameter of each of the hub portion 202*a* and the coupling elements proximate to the rectangular exit 204 (e.g., in radial alignment with the rectangular exit 204, with respect to the central axis 222). The blade-bullet of the phasing plug (not shown) may be positioned in the waveguide channel 220 of the housing 202, as further described with respect to FIGS. 4-7**.

Figure 11:
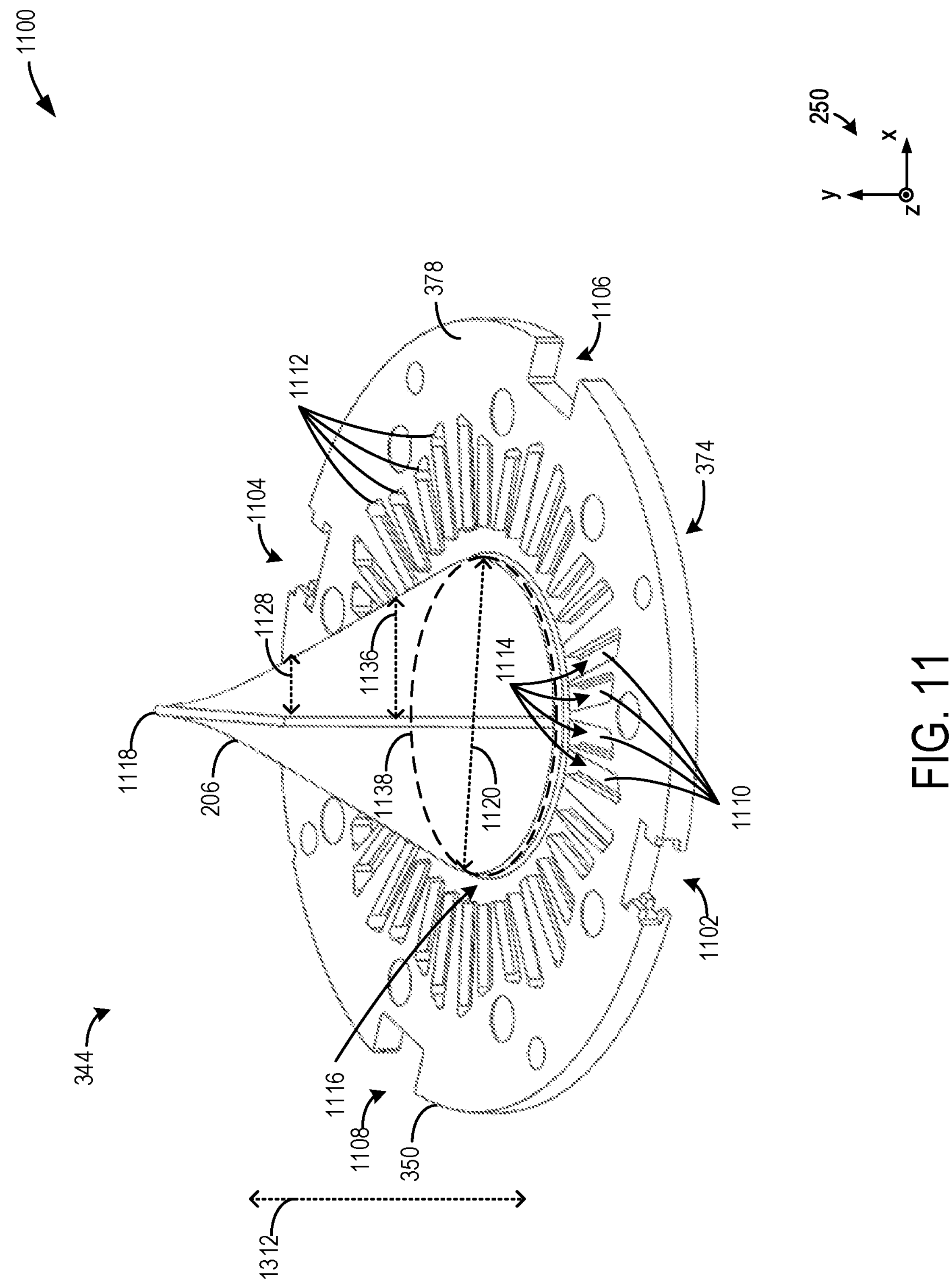
FIG. 11 shows a first perspective view of a phasing plug of the compression driver of FIG. 2, in accordance with one or more embodiments of the present disclosure.
Figure 12:
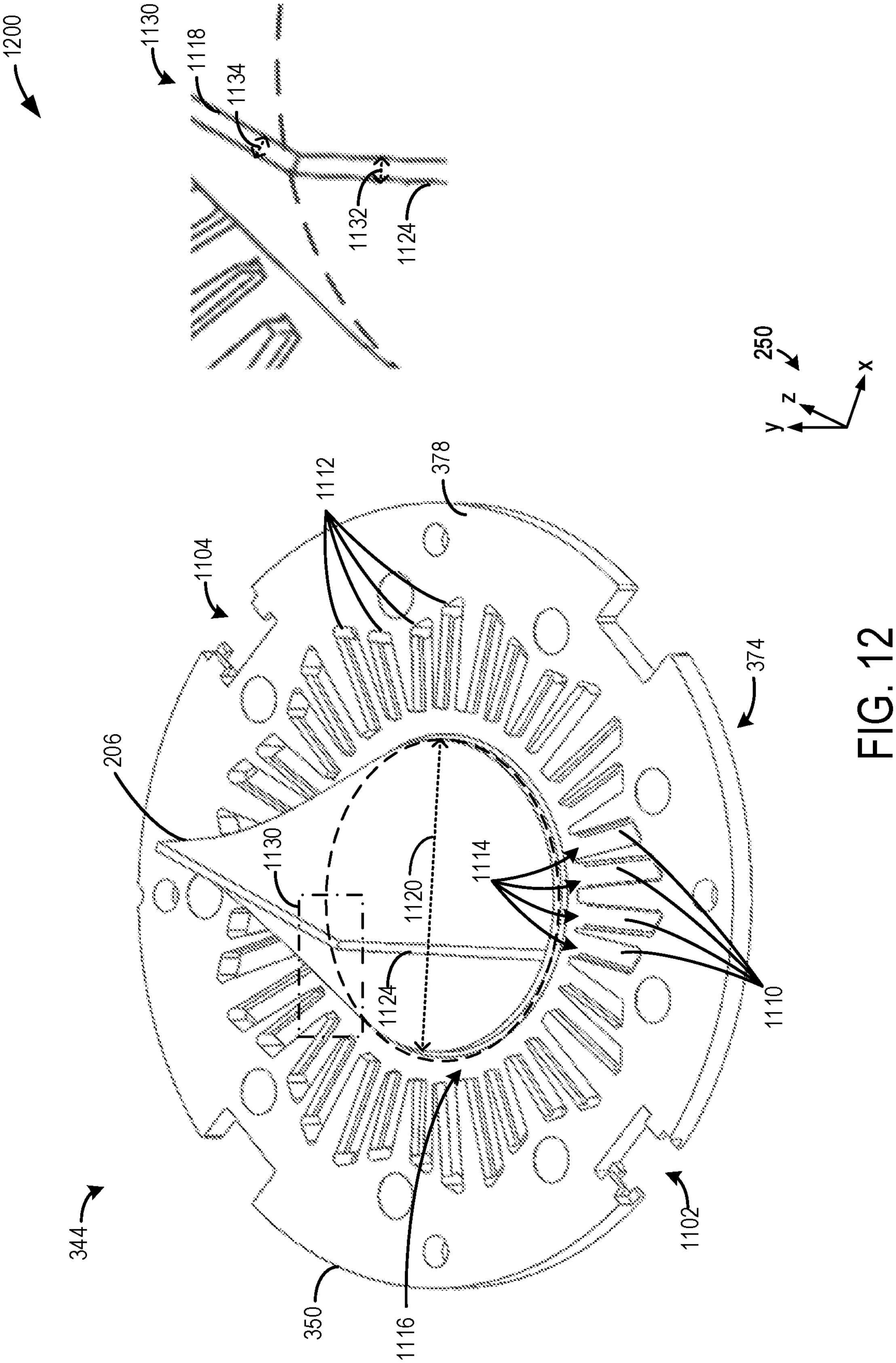
FIG. 12 shows a second perspective view of the phasing plug of FIG. 11, in accordance with one or more embodiments of the present disclosure.
Figure 13:
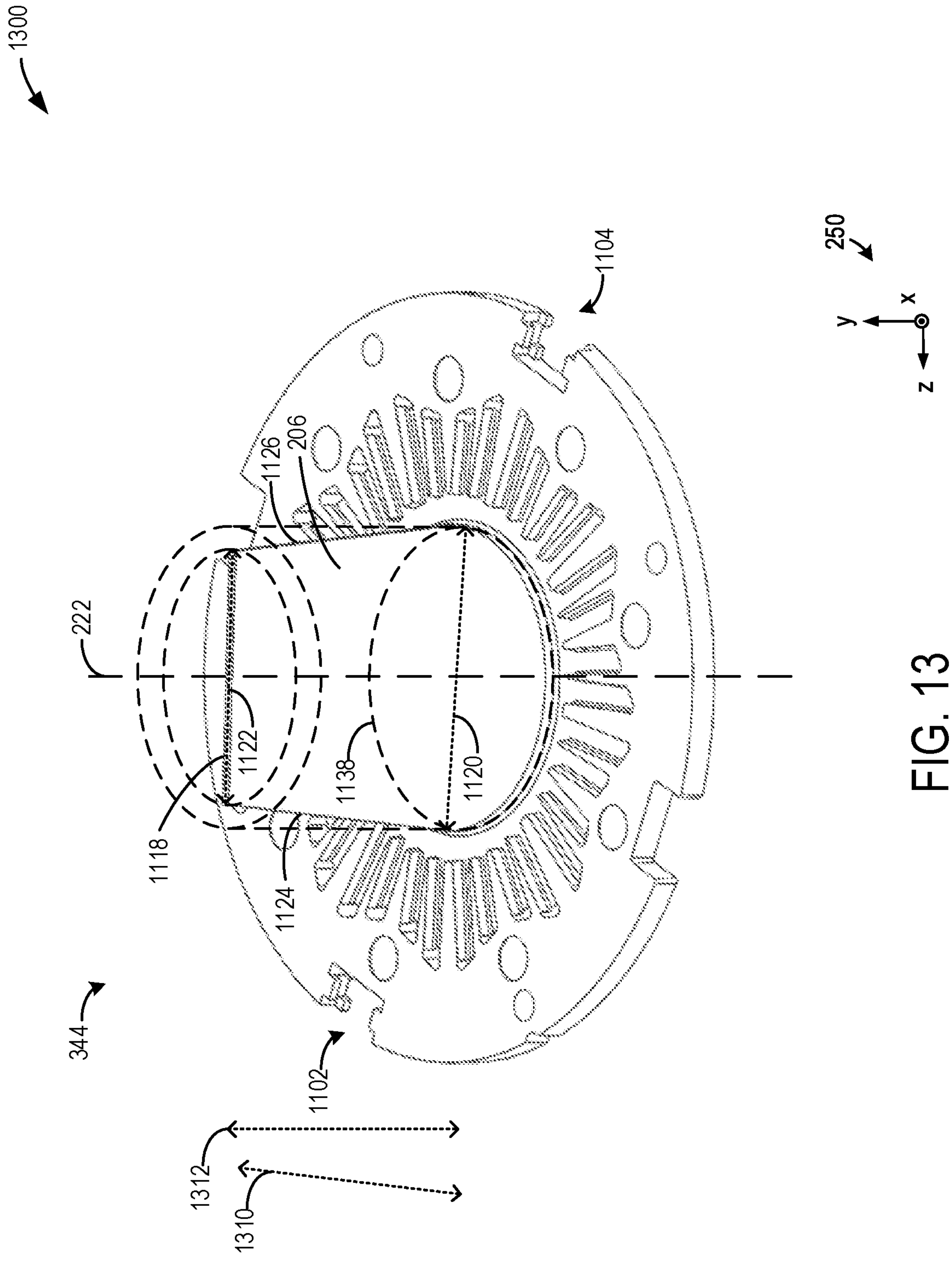
FIG. 13 shows a third perspective view of the phasing plug of FIG. 11, in accordance with one or more embodiments of the present disclosure.
Figure 14:
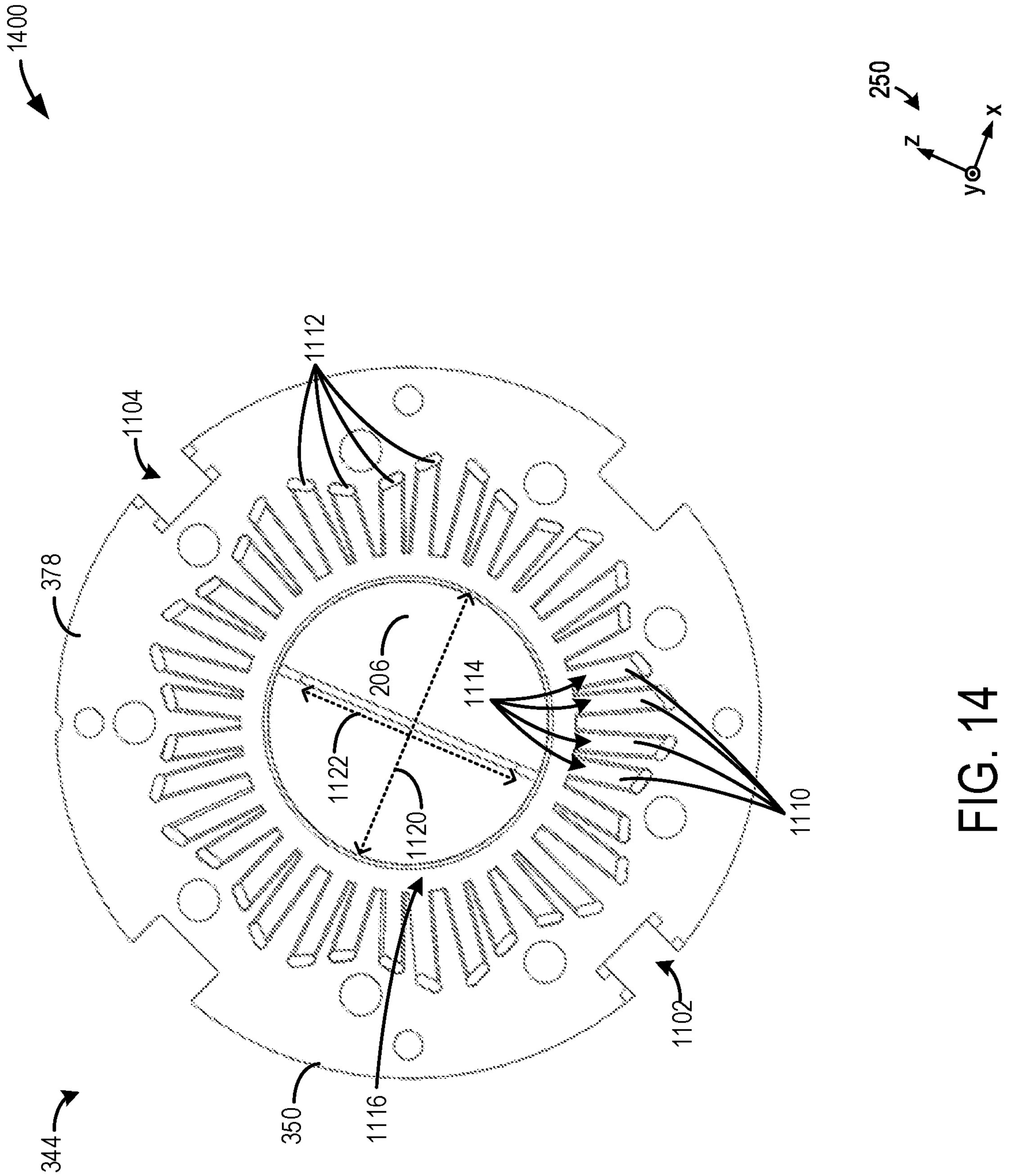
FIG. 14 shows a fourth perspective view of the phasing plug of FIG. 11, in accordance with one or more embodiments of the present disclosure.

Turning now to FIGS. 11-14 additional views are shown of the phasing plug 344 (as shown in FIG. 3) of the compression driver 200. The phasing plug 344 may be positioned in the waveguide channel 220 of the housing 202, as described with respect to FIGS. 4-7, to form the waveguide which may direct sound waves out of the compression driver 200. FIG. 11 shows a first perspective view 1100 of the phasing plug 344, FIG. 12 shows a second perspective view 1200 of the phasing plug 344, FIG. 13 shows a third perspective view 1300 of the phasing plug 344, and FIG. 14 shows a fourth perspective view 1400 of the phasing plug 344. Elements of the phasing plug 344 which are introduced in FIGS. 1-3 may be shown in FIGS. 11-14 and may not be reintroduced for brevity.

The base 350 may be configured with cutouts for positioning connectors therein which, when provided with electrical signals, energize a voice coil of the compression driver. In the embodiment shown herein, the base 350 of the phasing plug 344 includes a third cutout 1102, a fourth cutout 1104, a fifth cutout 1106, and a sixth cutout 1108, however other embodiments of phasing plugs may include more than or less than four cutouts. The fifth cutout 1106 and the sixth cutout 1108 may be excluded from the phasing plug 344, in some embodiments. A connector, such as the connector 208 shown in FIG. 2, may be coupled to the phasing plug 344 by sliding a connector into each of the third cutout 1102 and the fourth cutout 1104 in a direction perpendicular to the central axis 222. A portion of the connector may extend axially along the central axis 222 and extend through the base portion **202*b* of the housing 202 when the compression driver 200 is assembled, as described with respect to FIG. 2. In other embodiments, a connector may be coupled to the phasing plug 344** by any suitable means.

As briefly described with respect to FIG. 3, the base 350 may include one or more apertures that extend as channels through the thickness of the base 350 from the input side 374 to the output side 378. The one or more apertures extend between a compression chamber 306 and the waveguide portion of the compression driver 200 to provide acoustic pathways from the compression chamber 306 to the waveguide. The cross-sectional area of the apertures is small in comparison to the effective area of the diaphragm, thereby providing air compression and increased sound pressure in the compression chamber 306. The one or more apertures may be configured as a plurality of vertical channels (e.g., through the thickness of the base 350) arranged in a circumferential meandering pattern. The one or more apertures may form acoustical paths which run from the compression chamber 306 (e.g., a spacing between the diaphragm 308 and the input side 374 of the base 350, as further described with respect to FIG. 5) into an entrance 1112 on the input side 374, through the thickness of the base 350 into a corresponding aperture 1110 of the plurality of apertures, through a corresponding exit 1114 on the output side 378 and into a central bore 1116. The central bore 1116 may be in axial alignment along the central axis 222 with the circular inlet 1004 of the housing 202 when the compression driver 200 is assembled.

As shown in FIGS. 11-14, the hub 206 of the phasing plug 344 has a blade-bullet shape, where the blade-bullet shape may be approximately conical and tapers to a planar wall arranged in a center of the phasing plug 344. In other embodiments, the hub 206 may have a convex shape, a concave shape, and/or a bulging shape such that, when positioned in the waveguide channel 220, an area of the waveguide increases from an exit of the compression chamber 306 (e.g., a phasing plug entrance) to the rectangular exit 204, as further described herein. The blade-bullet shape of the hub 206 includes a circular base 1138 coupled to the base 350 of the phasing plug 344. The blade-bullet shape further includes a blade 1118, distal from the base 350 (e.g., along the y-axis, with respect to the axis system 250). The circular base 1138 has a base diameter 1120 which may be greater than a blade length 1122 of the blade 1118. The blade-bullet shape of the hub 206 narrows from the base diameter 1120 to the blade length 1122 along both the x-axis and the z-axis, with respect to the axis system 250.

The circular base 1138 may be coupled to the blade 1118 by a first planar end surface 1124 and a second planar end surface 1126, as shown in FIG. 13. Each of the first planar end surface 1124 and the second planar end surface 1126 are approximately flat surfaces without curvature. The first planar end surface 1124 and the second planar end surface 1126 are angled inwards towards each other and towards a center of the hub 206 (e.g., the central axis 222). In this way, the blade length 1122 of the blade 1118 is less than the base diameter 1120 of the circular base 1138. In some embodiments, the blade length 1122 may be between 90-95% of the base diameter 1120.

The gradual narrowing of the hub 206 from the circular base 1138 into the blade 1118 can be visualized as a trapezoidal plane extending the height 1312 of the hub 206. The first planar end surface 1124 and the second planar end surface 1126 may define edges of the trapezoidal plane. The first planar end surface 1124 and the second planar end surface 1126 may linearly connect the circular base 1138 (e.g., the base diameter 1120) and the blade (e.g., the blade length 1122). As shown in a detailed view 1130 of FIG. 12, a blade width 1134 of the blade 1118 may be approximately equal to a planar end surface width 1132. Each of the first planar end surface 1124 and the second planar end surface 1126 may have the planar end surface width 1132 for the height 1312 of the hub 206. The blade width 1134 may extend along the blade length 1122. In this way, a conical outer surface of the blade-bullet shape of the hub 206 tapers inwards towards the planar wall (e.g., the trapezoidal plane). The trapezoidal plane arranged along the z-axis, with respect to the axis system 250, therefore has the base diameter 1120 at the circular base 1138, the blade length 1122 at the blade 1118 a planar length 1310 along each of the first planar end surface 1124 and the second planar end surface 1126, where the planar length 1310 may be less than the height 1312 of the hub 206, and the blade width 1134 and the planar end surface width 1132 along the x-axis, with respect to the axis system 250.

As shown in FIGS. 11 and 12, the blade-bullet shape of the hub 206 may bulge out from (e.g., perpendicular to) the trapezoidal plane (e.g., along the x-axis, with respect to the axis system 250), then slant inwards towards the trapezoidal plane, moving towards the blade 1118. In other terms, a width of the blade-bullet, perpendicular to the blade length 1122 of the blade (e.g., along the x-axis, with respect to the axis system 250), may decrease from the circular base 1138 to the blade 1118. A radius of curvature of side surfaces of the blade-bullet shape to the planar wall (e.g., the trapezoidal plane) may gradually decrease. For example, as shown in FIG. 11, the blade-bullet shape may have a first radius 1136 between the trapezoidal plane and an outer surface of the blade-bullet shape proximate to the circular base 1138 (e.g., in radial alignment with the circular base 1138) and may have a second radius 1128 proximate to the blade 1118 (e.g., closer to the blade than to the circular base 1138, with respect to the height 1312 of the hub 206). The radius of curvature gradually decreases from half of the base diameter 1120 to a negligible radius at the blade 1118, such that the transition of the surface from the circular base 1138 to the planar wall is smooth.

In this way, the blade-bullet shape of the hub 206 of the phasing plug 344 has an initial volume at the circular base 1138 that decreases as the hub 206 narrows from the circular base 1138 to the blade 1118. As further described herein, when the phasing plug 344 is implemented in the compression driver 200 and the hub 206 is positioned in the waveguide channel 220 of the housing 202, an area of the waveguide may increase from the inlet to the rectangular exit 204 as the area of the waveguide channel 220 decreases from the inlet to the rectangular exit 204.

As further described with respect to FIGS. 4-7, the blade-bullet shape of the hub 206 may be positioned in the waveguide channel 220 of the housing 202 when the compression driver 200 is assembled to form the waveguide. The blade-bullet shape of the hub 206 may be positioned in the waveguide channel 220 in such a way that an area of the waveguide increases from an inlet of the waveguide to an exit of the waveguide (e.g., the rectangular exit 204). In this way, reflections and undesirable inconsistencies in sound pressure frequency responses may be reduced, compared to a waveguide with an area that decreases from the inlet to the exit of the waveguide. Further, as the exit of the waveguide is rectangular (e.g., the rectangular exit 204), dimensions of the exit of the waveguide may be adjusted such that the width of the rectangular exit 204 is sufficiently small to provide directivity control for high frequency sound waves while the length of the rectangular exit 204 may be such that the area of the waveguide (e.g., the waveguide channel 220 in combination with the phasing plug 344) increases from the inlet to the exit of the waveguide. Dimensions of the blade-bullet shape are further described with respect to the waveguide channel 220 in descriptions of FIGS. 4 and 6.

FIG. 4 shows a first cross-sectional view 400 along a first axis 240 of the compression driver 200 of FIG. 2. The first axis 240 may bisect the compression driver 200 along the length 224 of the rectangular exit 204. The compression driver 200 is shown in an assembled configuration in FIG. 4, where the phasing plug 344 is coupled to the housing 202 and the blade-bullet (e.g., the hub 206) of the phasing plug 344 extends into the waveguide channel 220 of the housing 202. FIG. 4 thus shows a waveguide formed by the phasing plug 344 and the housing 202. Elements of the compression driver 200 which are introduced in FIGS. 1-3 and 8-14 may be included in FIG. 4 and may not be reintroduced for brevity.

As described with respect to FIGS. 2, 8-14, a waveguide 420 may be formed by the housing 202 and the phasing plug 344 positioned therein. The housing 202 is configured with the waveguide channel 220, which has the circular inlet 1004 (as described with respect to FIG. 10) at a first end proximate to the base 350 of the phasing plug 344 (e.g., where a face of the housing 202 having the circular inlet 1004 is in face-sharing contact with the output side 378 of the phasing plug 344). The waveguide channel 220 further includes the rectangular exit 204 at a second end proximate to (e.g., in radial alignment with) the blade of the blade-bullet (e.g., a linear blade of the hub 206 of the phasing plug 344). The waveguide channel 220 may have a first diameter 402, proximate to the base 350 of the phasing plug 344, which gradually reduces as the waveguide channel 220 transforms into the rectangular exit 204. The first diameter 402 of the waveguide channel 220 may be greater than the base diameter 1120 of the phasing plug 344 at the circular base, as described with respect to FIGS. 11-14. Therefore, a gap is formed between interior walls of the waveguide channel 220 (e.g., facing the phasing plug 344) and the hub 206 (e.g., the blade-bullet) of the phasing plug 344. This gap is herein referred to as the waveguide 420.

As described above, the first diameter 402 of the waveguide channel 220 gradually decreases from the circular inlet 1004 to the rectangular exit 204, therefore an area of the waveguide channel 220 gradually decreases in the same direction. This may result in sound wave reflections and undesirable inconsistencies in sound pressure frequency responses. However, positioning the hub 206 of the phasing plug 344 in the waveguide channel 220 may gradually increase the area of the waveguide 420, due to the blade-bullet shape of the hub 206. For example, as described with respect to FIGS. 11-14, the width of the blade-bullet, parallel to the width 226 of the rectangular exit 204, may decrease from the circular base (e.g., having the base diameter 1120) to the blade of the blade-bullet. Therefore, a distance between the hub 206 of the phasing plug 344 and walls of the waveguide channel 220 may increase from the circular inlet 1004 to the rectangular exit 204, as shown by a first distance 404 and a second distance 406 (where the second distance 406 is greater than the first distance 404), thus increasing the area of the waveguide 420 in the same direction. In this way, the rectangular exit 204 may have a smaller area and a smaller width (e.g., the width 226) than the circular inlet 1004, and the area of the waveguide 420 may increase from the circular inlet 1004 to the rectangular exit 204.

Additionally, as described above, the width 226 may be less than the length 224 (not shown) of the rectangular exit 204, which may allow for directivity control of sound waves of a high frequency, as directivity control is provided by a throat of a horn. An inlet of a horn (e.g., the horn 108 of FIG. 1) coupled to the compression driver 200 may have dimensions equal to those of the compression driver. In some embodiments, the inlet of the horn may be rectangular and have a length and a width equal to the length and the width of the rectangular exit 204 of the compression driver 200, respectively. In other embodiments, the horn may have a circular inlet, such as that of a conventional compression driver. A diameter of the circular inlet of the horn may be equal to the width of the rectangular exit 204. In this way, the exit of the compression driver 200 (e.g., the rectangular exit 204) and the inlet of the horn may have at least one equal dimension which is sufficiently sized to provide directivity control for high frequency sound waves. Additionally, the rectangular exit 204 may have a dimension which is not equal to the dimensions of the horn (e.g., the diameter of the circular horn inlet), such as the length 224 of the rectangular exit 204. In this way, the compression driver 200 may further provide control for, and therefore reduce instances of, sound wave reflections and undesirable inconsistencies in sound pressure frequency responses by providing a cross-sectional area of the waveguide 420 of the compression driver 200 which increases from the circular inlet 1004 of the waveguide channel 220 to the rectangular exit 204.

Turning now to FIG. 6, a second cross-sectional view 600 along a second axis 242 of the compression driver 200 of FIG. 2 is shown. The second axis 242 may bisect the compression driver 200 along the width 226 of the rectangular exit 204. The compression driver 200 is shown in an assembled configuration in FIG. 6, where the phasing plug 344 is coupled to the housing 202 and the blade-bullet (e.g., the hub 206) of the phasing plug 344 extends into the waveguide channel 220 of the housing 202. FIG. 6 thus shows the waveguide 420 formed by the phasing plug 344 and the housing 202. Elements of the compression driver 200 which are introduced in FIGS. 1-4 and 8-14 may be included in FIG. 6 and may not be reintroduced for brevity.

As described with respect to FIG. 4, the waveguide 420 may be formed by the housing 202 and the phasing plug 344 positioned therein. The circular inlet 1004 of the waveguide channel 220 has the first diameter 402 along the second axis 242 of FIG. 6, as well as along the first axis 240 of FIG. 4. A diameter of the waveguide channel 220 gradually decreases as the waveguide channel 220 transforms into the rectangular exit 204, as described with respect to FIG. 4. The second cross-sectional view 600 shows the trapezoidal plane of the blade-bullet shape of the hub 206 of the phasing plug 344, as described with respect to FIGS. 11-14. As described above, the first diameter 402 of the waveguide channel 220 gradually decreases from the circular inlet 1004 to the rectangular exit 204, therefore an area of the waveguide channel 220 gradually decreases in the same direction. When positioned in the waveguide channel 220, the trapezoidal plane of the blade-bullet shape of the hub 206 may appear to decrease the area of the waveguide 420 moving from the circular inlet 1004 to the rectangular exit 204. For example, a third distance 604, proximate to the circular inlet 1004, may be greater than a fourth distance 606, proximate to the rectangular exit 204. In other words, a cross-sectional area of the waveguide 420 as shown by the second cross-sectional view 600 may decrease from the circular inlet 1004 to the rectangular exit 204. However, as described with respect to FIG. 4, the blade-bullet shape of the hub 206 of the phasing plug 344 may be shaped such that a total area of the waveguide 420 increases from the circular inlet 1004 to the rectangular exit 204. The distance between the hub 206 and the waveguide channel 220 at an axial point along the central axis 222 may increase rotationally about the central axis 222. For example, the first axis 240 of FIG. 4 is perpendicular to the second axis 242 of FIG. 6. A first radial distance between a first point 616 (of FIG. 6) on the waveguide channel 220 and the hub 206 may be a smallest distance between the waveguide channel 220 and the hub 206 in the embodiment described herein. A second radial distance between a second point 416 (of FIG. 4) on the waveguide channel 220 and the hub 206 may be a greatest distance between the waveguide channel 220 and the hub 206 in the embodiment described herein, where the first point 616 and the second point 416 are at an equal axial position, with respect to the central axis 222. A radial distance between the waveguide channel 220 and the hub 206 may gradually increase for points at the equal axial position between the second axis 242 and the first axis 240. Therefore, an overall area of the waveguide 420 may increase from the circular inlet 1004 to the rectangular exit 204 while the area of the waveguide channel 220 decreases in the same direction. This may reduce instances of sound wave reflections and undesirable inconsistencies in sound pressure frequency responses for sound waves emitted by the compression driver 200.

Additionally, as described above, the length 224 may be greater than the width 226 (not shown in FIG. 6) of the rectangular exit 204. The width 226 may be sized to provide directivity control of sound waves at high frequencies. The rectangular shape of the rectangular exit 204 allows the length 224 to be independent of the width 226, which may allow an area of the rectangular exit 204 to be greater than an area of a phasing plug entrance (e.g., a total area of entrances 1112 of the one or more apertures of the phasing plug 344, as describe with respect to FIGS. 11-14). In other words, it is desirable for a cross-sectional area of the compression driver (e.g., the waveguide channel 220) to increase from an exit of the compression chamber 306 (e.g., where the exit of the compression chamber 306 is equivalent to the phasing plug entrance) to the rectangular exit 204. For example, the length 224 may be twice as long as the width 226. In other embodiments, the length 224 may be greater than or less than twice as long as the width 226, so long as the length 224 is greater than the width 226, the width 226 is sized to provide directivity control for sound waves at high frequencies, and an area of the rectangular exit 204 is greater than the area of the entrance of the phasing plug 344. In this way, the exit of the compression driver 200 (e.g., the rectangular exit 204) and the inlet of the horn may have at least one equal dimension (e.g., the width 226) which is sufficiently sized to provide directivity control for high frequency sound waves. Additionally, the rectangular exit 204 may have a dimension (e.g., the length 224) which is not equal to the dimensions of the horn, which may allow the area of the waveguide 420 to increase from the inlet (e.g., the circular inlet 1004) to the exit (e.g., the rectangular exit 204).

FIGS. 5 and 7 show exploded cross-sectional views of the compression driver 200 of FIG. 2 along the first axis 240 and the second axis 242 of FIG. 2, respectively. Elements of the compression driver 200 which are introduced in FIG. 3 may be shown in FIGS. 5-7 and may not be reintroduced for brevity.

FIG. 5 shows a first exploded view in cross-section 500 along the first axis of the compression driver 200 of FIG. 2, as shown in FIG. 4, and additional components and features which may be provided. FIG. 7 shows a second exploded view in cross-section 700 along the first axis of the compression driver 200 of FIG. 2, as shown in FIG. 6, and additional components and features which may be provided. Referring to both FIGS. 5 and 7, the diaphragm 308 may include a profiled section, such as a V-shaped section 512 having a circular apex 516 coaxial with the central axis 222. The voice coil 324 or the coil former 310 may be attached to the diaphragm 308 at the apex 516 to facilitate actuation of the diaphragm 308 by the aforementioned annular top plate 334 and back plate 336. The pole piece 338, which may be integrated with the back plate 336, may include a central bore 526. The annular top plate 334 and the annular permanent magnet 332 on the one side and the pole piece 338 on the other side cooperatively define an air gap 528. In the assembled form of the compression driver 200 (e.g., as shown in FIG. 2), the voice coil 324 and coil former 310 are disposed in the air gap 528 such that the voice coil 324 is immersed in a magnetic field, and the air gap 528 provides axial spacing through which the voice coil 324 may oscillate. Upon assembly of the compression driver 200, the compression chamber 306 is defined in a spacing between the diaphragm 308 and the input side 374 of the base 350 of the phasing plug 344. In practice, the height of the compression chamber 306 (e.g., the distance between the diaphragm 308 and the input side 374 of the base 350) may be quite small (e.g., approximately 0.5 mm or less) such that the volume of the compression chamber 306 is also small. In implementations where the diaphragm 308 includes the V-shaped section 512, the base 350 at the input side 374 may also include a complementary V-shaped section 536 (or other type of profiled section) positioned in general alignment with the V-shaped section 512 to maintain the small volume of the compression chamber 306. As described with respect to FIGS. 4, 6, and 11-14, the hub 206 of the phasing plug 344 generally includes one or more outer surfaces 540 and the housing 202 includes an inner surface 544 (e.g., walls of the waveguide channel 220). After assembly of the phasing plug assembly 340, the one or more outer surfaces 540 and inner surface 544 cooperatively define the waveguide 420 for the propagation of sound waves through the phasing plug assembly 340. The waveguide 420 terminates at the rectangular exit 204 of the phasing plug assembly 340 such that the waveguide 420 fluidly communicates with the interior 142 of the horn 108, if provided (as shown in FIG. 1). The horn 108 may also be considered to be a waveguide in that sound energy radiates through the horn 108 and is constrained by the horn structure 124 of the horn 108 that shapes its interior 142.

In this way, the compression driver described herein may provide directivity control for high frequency sound waves using the rectangular exit. Further, reflections and undesirable inconsistencies in sound pressure frequency responses may be reduced by the waveguide.

The disclosure also provides support for a compression driver, comprising: an annular diaphragm, a phasing plug, and a housing, wherein the housing has a rectangular exit proximate to a blade of the phasing plug. In a first example of the system, a length of the rectangular exit is greater than a width of the rectangular exit. In a second example of the system, optionally including the first example, the housing includes a waveguide channel having a circular inlet and the rectangular exit. In a third example of the system, optionally including one or both of the first and second examples, an area of the circular inlet is greater than an area of the rectangular exit. In a fourth example of the system, optionally including one or more or each of the first through third examples, a waveguide is formed by the phasing plug positioned in the waveguide channel of the housing. In a fifth example of the system, optionally including one or more or each of the first through fourth examples, an area of the waveguide increases from the circular inlet to the rectangular exit along a central axis. In a sixth example of the system, optionally including one or more or each of the first through fifth examples, the phasing plug is formed of a hub coupled to a base and wherein the hub has a blade-bullet shape. In a seventh example of the system, optionally including one or more or each of the first through sixth examples, the blade-bullet shape is conical and tapers to a planar wall arranged in a center of the hub. In an eighth example of the system, optionally including one or more or each of the first through seventh examples, the hub has a base diameter at a circular base coupled to the base and a blade length at the blade, where the blade is distal from the circular base along a central axis such that the blade length and the base diameter are parallel. In a ninth example of the system, optionally including one or more or each of the first through eighth examples, a first planar end surface and a second planar end surface of the planar wall of the hub are angled towards the central axis from the base diameter to the blade length. In a tenth example of the system, optionally including one or more or each of the first through ninth examples, a radius of the blade-bullet shape of the hub, perpendicular to the first planar end surface and the second planar end surface, decreases from the base diameter to the blade length. In an eleventh example of the system, optionally including one or more or each of the first through tenth examples, the base diameter is greater than the blade length. In a twelfth example of the system, optionally including one or more or each of the first through eleventh examples, the base of the phasing plug has a plurality of vertical channels extending through a thickness of the base and positioned in a circumferential meandering pattern. In a thirteenth example of the system, optionally including one or more or each of the first through twelfth examples, the rectangular exit of the housing is coupled to a rectangular inlet of a horn.

The disclosure also provides support for a loudspeaker, comprising: a compression driver and a horn, wherein the compression driver has a rectangular exit coupled to a rectangular throat of the horn. In a first example of the system, a length and a width of the rectangular exit are equal to a length and a width, respectively, of the rectangular throat of the horn. In a second example of the system, optionally including the first example, the compression driver further comprises a phasing plug having a blade-bullet shape such that a blade length of the blade-bullet shape is parallel to the length of the rectangular exit.

The disclosure also provides support for a compression driver housing, comprising a base portion, a hub portion extending from the base portion along a central axis of the compression driver housing, wherein the hub portion has a channel extending along the central axis with a rectangular exit, distal from the base portion, and a phasing plug positioned in the channel, such that an area of the channel decreases from an inlet of the channel to the rectangular exit, along the central axis. In a first example of the system, the phasing plug has a hub with a base diameter at a circular base and a blade length at a linear blade, and wherein a radius of the hub perpendicular to the blade length decreases from the base diameter to the blade length. In a second example of the system, optionally including the first example, an area between the hub of the phasing plug and the channel of the hub portion increases from the inlet of the channel to the rectangular exit.

The description of embodiments has been presented for purposes of illustration and description. Suitable modifications and variations to the embodiments may be performed in light of the above description or may be acquired from practicing the methods. The described systems are exemplary in nature, and may include additional elements and/or omit elements. The subject matter of the present disclosure includes all novel and non-obvious combinations and subcombinations of the various systems and configurations, and other features, functions, and/or properties disclosed.

As used in this application, an element or step recited in the singular and preceded with the word “a” or “an” should be understood as not excluding plural of said elements or steps, unless such exclusion is stated. Furthermore, references to “one embodiment” or “one example” of the present disclosure are not intended to be interpreted as excluding the existence of additional embodiments that also incorporate the recited features. The terms “first,” “second,” and “third,” etc. are used merely as labels, and are not intended to impose numerical requirements or a particular positional order on their objects. The following claims particularly point out subject matter from the above disclosure that is regarded as novel and non-obvious.

The invention claimed is:

1. A compression driver, comprising:

an annular diaphragm;

a phasing plug having a blade; and a housing having a waveguide channel with a circular inlet and a rectangular exit proximate to the blade of the phasing plug, wherein an area of the circular inlet is greater than an area of the rectangular exit.

2. The compression driver of claim 1, wherein a length of the rectangular exit is greater than a width of the rectangular exit.

3. The compression driver of claim 1, wherein a waveguide is formed by the phasing plug positioned in the waveguide channel of the housing.

4. The compression driver of claim 3, wherein an area of the waveguide increases from the circular inlet to the rectangular exit along a central axis.

5. The compression driver of claim 1, wherein the phasing plug is formed of a hub coupled to a base and wherein the hub has a blade-bullet shape.

6. The compression driver of claim 5, wherein the blade-bullet shape is conical and tapers to a planar wall arranged in a center of the hub.

7. The compression driver of claim 6, wherein the hub has a base diameter at a circular base coupled to the base and a blade length at the blade, where the blade is distal from the circular base along a central axis such that the blade length and the base diameter are parallel.

8. The compression driver of claim 7, wherein a first planar end surface and a second planar end surface of the planar wall of the hub are angled towards the central axis from the base diameter to the blade length.

9. The compression driver of claim 8, wherein a radius of the blade-bullet shape of the hub, perpendicular to the first planar end surface and the second planar end surface, decreases from the base diameter to the blade length.

10. The compression driver of claim 7, wherein the base diameter is greater than the blade length.

11. The compression driver of claim 5, wherein the base of the phasing plug has a plurality of vertical channels extending through a thickness of the base and positioned in a circumferential meandering pattern.

12. The compression driver of claim 1, wherein the rectangular exit is coupled to a rectangular inlet of a horn.

13. A loudspeaker, comprising:

a compression driver and a horn, wherein the compression driver has a housing with a channel having an inlet and a rectangular exit, the rectangular exit being coupled to a rectangular throat of the horn, wherein an area of the channel decreases from the inlet to the rectangular exit.

14. The loudspeaker of claim 13, wherein a length and a width of the rectangular exit are equal to a length and a width, respectively, of the rectangular throat of the horn.

15. The loudspeaker of claim 14, wherein the compression driver further comprises a phasing plug positioned in the channel, the phasing plug having a blade-bullet shape such that a blade length of the blade-bullet shape is parallel to the length of the rectangular exit.

16. The loudspeaker of claim 15, wherein the blade-bullet shape is conical and tapers to a planar wall arranged in a center of a hub of the phasing plug.

17. A compression driver with a housing and a phasing plug, the housing comprising:

a base portion; and a hub portion extending from the base portion along a central axis of the housing, wherein the hub portion has a channel extending along the central axis from an inlet of the channel to a rectangular exit of the channel distal from the base portion, the phasing plug being positioned in the channel, and wherein an area of the channel decreases along the central axis such that an area of the inlet is greater than an area of the rectangular exit.

18. The compression driver of claim 17, wherein the phasing plug has a hub with a base diameter at a circular base and a blade length at a linear blade, and wherein a radius of the hub perpendicular to the blade length decreases from the base diameter to the blade length.

19. The compression driver of claim 18, wherein an area between the hub of the phasing plug and the channel of the hub portion increases from the inlet of the channel to the rectangular exit.

20. The compression driver of claim 17, wherein the phasing plug has a blade-bullet shape that is conical and tapers to a planar wall arranged in a center of a hub of the phasing plug.

* * * * *